(12) United States Patent
Sakauchi et al.

(10) Patent No.: US 8,693,880 B2
(45) Date of Patent: Apr. 8, 2014

(54) WAVELENGTH PATH COMMUNICATION NODE APPARATUS, WAVELENGTH PATH COMMUNICATION CONTROL METHOD, AND RECORDING MEDIUM

(75) Inventors: Masahiro Sakauchi, Tokyo (JP); Shigeru Nakamura, Tokyo (JP); Yutaka Urino, Tokyo (JP); Itaru Nishioka, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 12/992,167

(22) PCT Filed: May 22, 2009

(86) PCT No.: PCT/JP2009/059419
§ 371 (c)(1),
(2), (4) Date: Jan. 26, 2011

(87) PCT Pub. No.: WO2009/145118
PCT Pub. Date: Dec. 3, 2009

(65) Prior Publication Data
US 2011/0116790 A1     May 19, 2011

(30) Foreign Application Priority Data

May 26, 2008    (JP) .................... 2008-136614

(51) Int. Cl.
*H04J 14/02* (2006.01)
*H04B 10/08* (2011.01)

(52) U.S. Cl.
USPC .................. 398/140; 398/48; 398/5; 398/83; 385/24

(58) Field of Classification Search
USPC .................... 398/48, 45, 43, 140, 5
See application file for complete search history.

(56) References Cited

U.S. PATENT DOCUMENTS 5,973,809 A * 10/1999 Okayama .................... 398/48
6,286,104 B1 * 9/2001 Buhle et al. .................. 726/4
(Continued)

FOREIGN PATENT DOCUMENTS

| JP | 2001274751 A | 10/2001 |
| JP | 3533316 B | 5/2004 |
| JP | 2006087062 A | 3/2006 |
| JP | 2006140598 A | 6/2006 |

OTHER PUBLICATIONS
International Search Report for PCT/JP2009/059419 mailed Aug. 25, 2009.
(Continued)

*Primary Examiner* — Oommen Jacob
(74) *Attorney, Agent, or Firm* — Sughrue Mion, PLLC

(57) ABSTRACT

A wavelength path communication node apparatus includes a wavelength path demultiplexer (321) which demultiplexes branched optical signals input to wavelength multiplexing ports into wavelength path signals, and outputs the wavelength path signals from wavelength demultiplexing ports corresponding to the respective wavelengths, a wavelength path multiplexer (322) which outputs wavelength path signals input to wavelength demultiplexing ports from wavelength multiplexing ports corresponding to the wavelengths of the wavelength path signals, a plurality of transponders (331) each of which converts a wavelength path signal input to a wavelength path transmission port into a client transmission signal to transmit the client transmission signal, and converts a received client reception signal into a wavelength path signal of a wavelength to output the wavelength path signal from a wavelength path reception port, a demultiplexing system optical matrix switch (323) which switches and connects the wavelength demultiplexing ports of the wavelength path demultiplexer and the wavelength path transmission ports of the transponders, and a multiplexing system optical matrix switch (324) which switches and connects the wavelength demultiplexing ports of the wavelength path multiplexer and the wavelength path reception ports of the transponders.

10 Claims, 20 Drawing Sheets

(56) References Cited

U.S. PATENT DOCUMENTS

2003/0152072 A1* 8/2003 Guild et al. .................. 370/386
2004/0234194 A1* 11/2004 Persson ........................ 385/24
2006/0034610 A1* 2/2006 Akiyama et al. ............... 398/83

OTHER PUBLICATIONS

M. Hayashi et al., "Highly Reliable Optical Bidirectional Path Switched Ring Networks Applicable to Photonic IP Networks", Journal of Lightwave Technology, vol. 21, No. 2, Feb. 2003, pp. 356-364.

* cited by examiner

FIG.7A

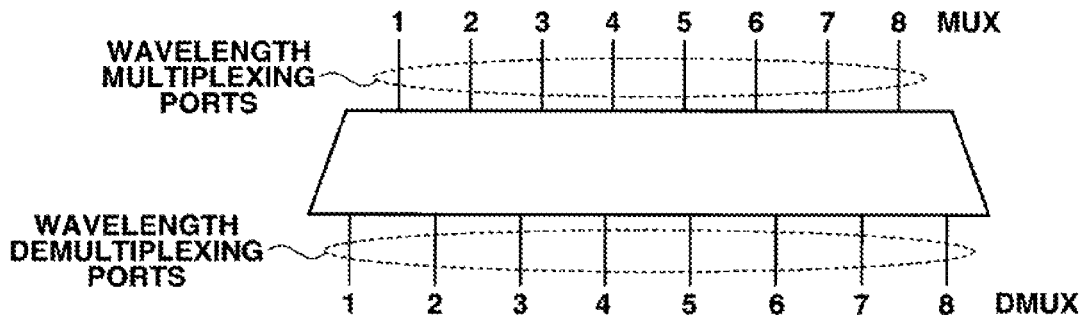

FIG.7B

|  | MUX 1 | MUX 2 | MUX 3 | MUX 4 | MUX 5 | MUX 6 | MUX 7 | MUX 8 |
|---|---|---|---|---|---|---|---|---|
| DMUX1 | $\lambda1$ | $\lambda2$ | $\lambda3$ | $\lambda4$ | $\lambda5$ | $\lambda6$ | $\lambda7$ | $\lambda8$ |
| DMUX2 | $\lambda2$ | $\lambda3$ | $\lambda4$ | $\lambda5$ | $\lambda6$ | $\lambda7$ | $\lambda8$ | $\lambda1$ |
| DMUX3 | $\lambda3$ | $\lambda4$ | $\lambda5$ | $\lambda6$ | $\lambda7$ | $\lambda8$ | $\lambda1$ | $\lambda2$ |
| DMUX4 | $\lambda4$ | $\lambda5$ | $\lambda6$ | $\lambda7$ | $\lambda8$ | $\lambda1$ | $\lambda2$ | $\lambda3$ |
| DMUX5 | $\lambda5$ | $\lambda6$ | $\lambda7$ | $\lambda8$ | $\lambda1$ | $\lambda2$ | $\lambda3$ | $\lambda4$ |
| DMUX6 | $\lambda6$ | $\lambda7$ | $\lambda8$ | $\lambda1$ | $\lambda2$ | $\lambda3$ | $\lambda4$ | $\lambda5$ |
| DMUX7 | $\lambda7$ | $\lambda8$ | $\lambda1$ | $\lambda2$ | $\lambda3$ | $\lambda4$ | $\lambda5$ | $\lambda6$ |
| DMUX8 | $\lambda8$ | $\lambda1$ | $\lambda2$ | $\lambda3$ | $\lambda4$ | $\lambda5$ | $\lambda6$ | $\lambda7$ |

FIG.7C

|  | MUX 1 | MUX 2 | MUX 3 | MUX 4 | MUX 5 | MUX 6 | MUX 7 | MUX 8 |
|---|---|---|---|---|---|---|---|---|
| DMUX1 | $\lambda1$ | $\lambda2$ | $\lambda3$ | $\lambda4$ | $\lambda5$ | $\lambda6$ | $\lambda7$ | $\lambda8$ |
| DMUX2 | $\lambda2$ | $\lambda3$ | $\lambda4$ | $\lambda5$ | $\lambda6$ | $\lambda7$ | $\lambda8$ | $\lambda1$ |
| DMUX3 | $\lambda3$ | $\lambda4$ | $\lambda5$ | $\lambda6$ | $\lambda7$ | $\lambda8$ | $\lambda1$ | $\lambda2$ |
| ... | ... | ... | ... | ... | ... | ... | ... | ... |
| DMUX38 | $\lambda38$ | $\lambda39$ | $\lambda40$ | $\lambda1$ | $\lambda2$ | $\lambda3$ | $\lambda4$ | $\lambda5$ |
| DMUX39 | $\lambda39$ | $\lambda40$ | $\lambda1$ | $\lambda2$ | $\lambda3$ | $\lambda4$ | $\lambda5$ | $\lambda6$ |
| DMUX40 | $\lambda40$ | $\lambda1$ | $\lambda2$ | $\lambda3$ | $\lambda4$ | $\lambda5$ | $\lambda6$ | $\lambda7$ |

FIG.9

| TPND ID | ROUTE WAVELENGTH SWITCHING/CLIENT SYSTEM OPTICAL MATRIX SWITCH CIRCUIT CONNECTION PORT NUMBER | OPERATING SYSTEM (NORMAL SYSTEM) WAVELENGTH PATH | | SPARE SYSTEM (ABNORMAL SYSTEM) WAVELENGTH PATH | | SPARE SYSTEM SHARED TPND | |
|---|---|---|---|---|---|---|---|
| | | TRANSMISSION LINE NUMBER | WAVELENGTH NUMBER | TRANSMISSION LINE NUMBER | WAVELENGTH NUMBER | TPND ID | ROUTE WAVELENGTH SWITCHING/CLIENT SYSTEM OPTICAL MATRIX SWITCH CIRCUIT CONNECTION PORT NUMBER |
| TPND #331 | #1 | #2 | λ2 | #3 | λ2 | TPND #332 | #9 |
| | | | | | | | |
| | | | | | | | |

WAVELENGTH PATH COMMUNICATION NODE APPARATUS, WAVELENGTH PATH COMMUNICATION CONTROL METHOD, AND RECORDING MEDIUM

TECHNICAL FIELD

The present invention relates to an optical communication network using a wavelength multiplexing/demultiplexing technique and, more particularly, to a wavelength path communication control technique in a wavelength path communication node apparatus included in a wavelength multiplexing/demultiplexing optical communication network.

BACKGROUND ART

Recently, the communication capacity keeps increasing in the field of information communication, and introduction of the wavelength division multiplexing (WDM) technique into core networks is examined. Introduction of optical communication into access networks is promoted, and various services requiring large capacities are provided more and more. At present, integration into packet routing-based networks is advancing. However, the packet transfer technique increases the delay amount and jitter amount (variations of the delay) for large amounts of video services, real-time services, and the like along with the expansion of the communication scale. As a result, the service quality degrades, and service contents are restricted.

To the contrary, the WDM technique, which uses wavelength paths for performing data communication using optical signals having unique wavelengths, can implement a large communication capacity, small delay amount, small jitter amount, and the like, and can solve the problems of the packet transfer technique. Hopes are running high for further development of the WDM technique in the field of information communication.

Together with introduction of the WDM technique into core networks, introduction of the WDM technique into metropolitan area networks and application of the ROADM (Reconfigurable Optical Add Drop Multiplexer) are also under discussion. The ROADM has a function of mainly gathering traffics in access networks, and connecting them to core networks. A relay optical node near a core network transits the gathered wavelength paths at high ratio without changing their wavelengths. Traffics between access networks will further increase because of P2P (Peer to Peer) and the like, and traffics loopback in metropolitan area networks are highly likely to increase further.

The WDM technique can handle only several hundred wavelength paths. Compared to a packet network in which a plurality of session flows can be virtually handled within the network, such an operation that a wavelength is permanently assigned to a service in a wavelength network would decrease the bandwidth utilization and raise the cost of equipment investment. It is expected that a larger number of services are multiplexed as the capacity of wavelength paths increases. A fault generated in the photonic physical layer may seriously affect a plurality of upper service layers.

Under the circumstance, a WDM technique capable of quickly responding to a demand, increasing reliability, and reducing the cost is expected. To meet this expectation, optical node apparatuses for a wavelength network and ROADM require flexible wavelength path setting capable of cooperating with an advanced control plane (CP), sophisticated functions, excellent expandability capable of small start, high utilizations for band (wavelength) resources and apparatus resources in wavelength networks, small size, low power consumption, and low operational cost. To satisfy these requirements, a variety of proposals have been made.

For example, Japanese Patent Laid-Open No. 2006-087062 (to be referred to as reference 1) discloses a node configuration which can add and drop wavelengths using photocouplers and wavelength selection switches. This configuration can expand apparatus resources in accordance with the number of routes. For a small number of routes or a small number of added/dropped wavelengths, the operation becomes possible with a minimum number of apparatus resources. Reference 1 also describes the arrangement of a wavelength multiplexer which multiplexes optical signals of individual wavelengths transmitted from individual Tx and transmits the multiplexed signal to a core unit, and the arrangement of a wavelength demultiplexer which demultiplexes a WDM signal from the core unit into individual wavelengths and receives them at Rx.

In this configuration, M×M matrix switches can input/output an optical signal to an arbitrary wavelength port of an optical multiplexer (optical demultiplexer). A permanent connection between the wavelength at Tx/Rx, the wavelength port of the optical multiplexer (optical demultiplexer), and the transmission/reception wavelength at Tx/Rx is canceled, optimizing Tx/Rx resources. FIG. 22 exemplifies the node apparatus described in reference 1.

The node apparatus shown in FIG. 22 includes optical branching couplers 2201, wavelength selection switches 2202 and 2203, wavelength multiplexer/demultiplexer units (AWG) 2204 and 2205, transponders 2206, and optical matrix switches 2212. The transponder 2206 transmits/receives a WDM signal 2207 and client signal 2208.

This node apparatus copes with four routes, i.e., transmission lines 1 to 4. WDM signals branched by the optical branching couplers 2201 are input to the wavelength selection switches 2202 which selectively multiplex wavelengths to other routes. At this time, each wavelength selection switch 2203 selects a wavelength to be dropped from the WDM signals branched by the corresponding optical branching coupler 2201, and inputs the selected Drop signal to the corresponding wavelength multiplexer/demultiplexer unit 2204.

Each optical matrix switch 2211 controls the switch so that a desired transponder 2206 receives a Drop signal demultiplexed by the wavelength multiplexer/demultiplexer unit 2204. Each optical matrix switch 2212 on the side of the wavelength multiplexer/demultiplexer unit 2205 controls the switch based on a WDM transmission signal from the transponder 2206 to select an input port of the wavelength multiplexer/demultiplexer unit 2205 that corresponds to the wavelength of the WDM transmission signal. The wavelength multiplexer/demultiplexer unit 2205 multiplexes WDM transmission signals from the subordinate transponder 2206. The wavelength selection switch 2202 selectively multiplexes the wavelengths of Transit wavelength path signals from other routes, and transmits the multiplexed signal to a corresponding route.

Reference: Japanese Patent No. 3533316 (to be referred to as reference 2) discloses the arrangements of a wavelength multiplexing transmission means and wavelength multiplexing reception means, and a switching operation to a spare optical transmitter or spare optical receiver when an optical transmitter and optical receiver fail.

In this arrangement, a spare optical transmitter and spare optical receiver can be made common to operating ones, reducing the cost and size of the system. If a fault occurs in an operating transmission line, a signal selection circuit in the wavelength multiplexing transmission means can change the wavelength multiplexer input port to switch the operating transmission line to a spare one.

Reference: "Highly Reliable Optical Bidirectional Path Switched Ring Networks Applicable to Photonic IP Networks", Journal of Lightwave Technology, Vol. 21, No. 2, February 2003 (to be referred to as reference 3) describes a node apparatus having wavelength path switches, and a WDM ring network configuration using the node apparatus. Optical matrix switches and transmission lines which implement the wavelength path switches have redundancy, improving the reliabilities of the node apparatus and network. FIG. 23 exemplifies the node apparatus described in reference 3.

The node apparatus shown in FIG. 23 includes wavelength multiplexer/demultiplexer units 2304 and 2305, transponders 2306, 1×2 optical matrix switches 2307 and 2311, and optical matrix switches 2318 and 2319. The 1×2 optical matrix switches 2311 receive/output client signals 2313. This node apparatus copes with three routes, i.e., transmission lines 1 to 3. Hence, the wavelength multiplexer/demultiplexer units 2304 and 2305 are arranged by numbers corresponding to the three routes.

Similarly, the transponders 2306 are also arranged by a number corresponding to all WDM wavelengths for the respective routes. The client of the transponder 2306 is connected to the optical matrix switches 2318 and 2319 via the 1×2 optical matrix switch 2307. The optical matrix switch 2318 is used in an operating system, and the optical matrix switch 2319 is used in a spare system. When the operating system optical matrix switch 2318 fails, the 1×2 optical matrix switch 2307 switches it to the spare system optical matrix switch 2319. Although not shown in FIG. 23, the number of compatible routes and the number of accommodated clients can be increased by expanding the switching capacities (number of ports) of the optical matrix switches 2318 and 2319.

DISCLOSURE OF INVENTION

Problems to be Solved by the Invention

However, these wavelength path communication control techniques have the following problems.

First, communicating the transmission/reception optical signal of a specific transponder via an arbitrary transmission route requires a large-scale optical matrix switch depending on the maximum number of routes coped with by a node having the transponder, and the maximum number of accommodated transponders. This results in high initial installation cost of the apparatus, large apparatus size, large power consumption, expensive redundant configuration, and poor WDM transmission performance.

For example, in the node apparatus shown in FIG. 22, the transponder 2206 connected to the wavelength multiplexer/demultiplexer circuits 2204 and 2205 can only receive a wavelength path signal from a specific transmission route or transmit a wavelength path signal to a specific transmission route. A connection path capable of wavelength path reception from another transmission route or wavelength path transmission to another transmission route does not exist in the node apparatus. A large-scale optical matrix switch is, therefore, necessary to communicate a transmission/reception optical signal to/from a specific transponder via an arbitrary transmission route, causing the above-mentioned problems.

A node apparatus may also be configured as shown in FIG. 24 to allow connecting WDM transmission/reception signals from/to transponders 2406 to wavelength multiplexer/demultiplexer units 2404 and 2405 belonging to arbitrary transmission routes by interposing optical matrix switches 2408 (operating system) and 2409 (spare system) between the transponders 2406 and the wavelength multiplexer/demultiplexer units 2404 and 2405. In this case, assuming that communication is done using all the wavelengths of all transmission routes, the optical matrix switches 2408 and 2409 need to have a switching capacity enough to accommodate transponders by a number obtained by multiplying the number of wavelengths by the number of routes. For example, when the number of WDM wavelengths per transmission line is 40 and the maximum number of compatible routes is 8, 320 transponders need to be accommodated.

In the node apparatus shown in FIG. 24, to enable communication setting of all these transponders for an arbitrary transmission route, double the resources of 320×320 bidirectional non-blocking switches are required for only the operating system. Arranging a spare system further requires double the resources. In this way, the switching capacities of the optical matrix switches considering the maximum number of wavelengths and the maximum number of routes are ensured in advance. This leads to problems such as very high initial installation cost, strict performance conditions requested of the optical matrix switches 2408 and 2409, which raises the cost, and poor transmission performance.

Second, transponder aggregators capable of WDM transmission communication by aggregating transponders need to be arranged by a number corresponding to the number of transmission routes. This causes problems such as a high initial installation cost of the apparatus, large apparatus size, and large power consumption. Note that the transponder aggregator is a functional block which can multiplex the wavelengths of wavelength path signals transmitted from transponders into a WDM signal, and demultiplex a WDM signal into individual wavelength path signals so that transponders can receive them. The transponder aggregator means a wavelength multiplexer/demultiplexer unit, a matrix switch connected to it, and the like.

For example, in the node apparatus shown in FIG. 24, the transponder aggregator (wavelength multiplexer/demultiplexer units 2404 and 2405) is arranged in correspondence with each transmission route. To enable communication by a specific transponder in an arbitrary transmission route, transponder aggregators need to be arranged in all transmission routes the node copes with, and thus, the foregoing problems arise. This also applies to the node apparatus shown in FIG. 22.

The present invention has been made to solve the above-described problems, and has as its exemplary object to provide a wavelength path communication node apparatus, wavelength path communication control method, program, and recording medium capable of implementing low cost, small size, and low power consumption.

Means of Solution to the Problems

To achieve the above exemplary object, according to the present invention, there is provided a wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the apparatus comprising a plurality of optical branching couplers which are arranged for the respective wavelength multiplexing transmission lines, and each of which branches power of an optical signal received from the wavelength multiplexing transmission line into a plurality of branched optical signals, a plurality of multiplexing system wavelength selection switches which are arranged for the respective wavelength multiplexing transmission lines, and each of which selects wavelength path signals of arbitrary wavelengths from the plurality of branched optical signals branched by the optical branching couplers, multiplexes the wavelength path signals into one optical signal, and transmits the optical signal to the wavelength multiplexing transmission line, a wavelength path demultiplexer which includes a plurality of wavelength multiplexing ports that are arranged for the respective optical branching couplers and receive the branched optical signals from the optical branching couplers, and a plurality of wavelength demultiplexing ports whose connection correspondence with the wavelength multiplexing ports is uniquely determined by a wavelength, and which demultiplexes the branched optical signals input to the wavelength multiplexing ports into wavelength path signals of respective wavelengths, and outputs the wavelength path signals from the wavelength demultiplexing ports corresponding to the respective wavelengths, a wavelength path multiplexer which includes a plurality of wavelength multiplexing ports that are arranged for the respective multiplexing system wavelength selection switches and output wavelength path signals of at least one wavelength to the multiplexing system wavelength selection switches, and a plurality of wavelength demultiplexing ports whose connection correspondence with the wavelength multiplexing ports is uniquely determined by a wavelength, and which outputs wavelength path signals input to the wavelength demultiplexing ports from the wavelength multiplexing ports corresponding to wavelengths of the wavelength path signals, a plurality of transponders each of which includes a wavelength path transmission port and a wavelength path reception port, is connected to a client apparatus that performs data communication using a wavelength path of one wavelength, converts a wavelength path signal input to the wavelength path transmission port into a client transmission signal to transmit the client transmission signal to the client apparatus, and converts a client reception signal received from the client apparatus into a wavelength path signal of the wavelength to output the wavelength path signal from the wavelength path reception port, a demultiplexing system optical matrix switch which switches and connects the wavelength demultiplexing ports of the wavelength path demultiplexer and the wavelength path transmission ports of the transponders, and a multiplexing system optical matrix switch which switches and connects the wavelength demultiplexing ports of the wavelength path multiplexer and the wavelength path reception ports of the transponders.

According to the present invention, there is provided a wavelength path communication control method used in a wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the method comprising the steps of causing each of optical branching couplers arranged for the respective wavelength multiplexing transmission lines to branch power of an optical signal received from the wavelength multiplexing transmission line into a plurality of branched optical signals, causing each of multiplexing system wavelength selection switches arranged for the respective wavelength multiplexing transmission lines to select wavelength path signals of arbitrary wavelengths from the plurality of branched optical signals branched by the optical branching couplers, multiplex the wavelength path signals into one optical signal, and transmit the optical signal to the wavelength multiplexing transmission line, causing a wavelength path demultiplexer including a plurality of wavelength multiplexing ports that are arranged for the respective optical branching couplers and receive the branched optical signals from the optical branching couplers, and a plurality of wavelength demultiplexing ports whose connection correspondence with the wavelength multiplexing ports is uniquely determined by a wavelength, to demultiplex the branched optical signals input to the wavelength multiplexing ports into wavelength path signals of respective wavelengths, and output the wavelength path signals from the wavelength demultiplexing ports corresponding to the respective wavelengths, causing a wavelength path multiplexer including a plurality of wavelength multiplexing ports that are arranged for the respective multiplexing system wavelength selection switches and output wavelength path signals of at least one wavelength to the multiplexing system wavelength selection switches, and a plurality of wavelength demultiplexing ports whose connection correspondence with the wavelength multiplexing ports is uniquely determined by a wavelength, to output wavelength path signals input to the wavelength demultiplexing ports from the wavelength multiplexing ports corresponding to wavelengths of the wavelength path signals, causing a plurality of transponders each including a wavelength path transmission port and a wavelength path reception port, to connect to a client apparatus that performs data communication using a wavelength path of one wavelength, convert a wavelength path signal input to the wavelength path transmission port into a client transmission signal, thereby transmitting the client transmission signal to the client apparatus, and convert a client reception signal received from the client apparatus into a wavelength path signal of the wavelength, thereby outputting the wavelength path signal from the wavelength path reception port, causing a demultiplexing system optical matrix switch to switch and connect the wavelength demultiplexing ports of the wavelength path demultiplexer and the wavelength path transmission ports of the transponders, and causing a multiplexing system optical matrix switch to switch and connect the wavelength demultiplexing ports of the wavelength path multiplexer and the wavelength path reception ports of the transponders.

According to the present invention, there is provided a program for causing, to execute the steps of the wavelength path communication control method, a computer of a wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines.

A recording medium according to the present invention records the program.

Effects of the Invention

According to the present invention, a bidirectional wavelength path to a wavelength multiplexing transmission line can be set. Neither a large-scale cross-connect switch corresponding to the maximum number of routes and the maximum number of accommodated clients, nor transponder aggregators dependent on the number of compatible routes need be arranged. The optical cross-connect switching means requires only a small switching capacity, decreasing the cost. The installation cost, apparatus size, and power consumption can be reduced in a wavelength path node apparatus capable of communicating a transmission/reception optical signal at a specific transponder via an arbitrary transmission route at an arbitrary wavelength.

BRIEF DESCRIPTION OF DRAWINGS

FIG. 7A is a view showing the arrangement of a wavelength multiplexer/demultiplexer unit;

FIG. 7B is a table showing the relationship between the wavelength and the wavelength multiplexing port in the wavelength multiplexer/demultiplexer unit in FIG. 7A;

FIG. 7C is a table for N=40 in FIG. 7B;

FIG. 9 is a table exemplifying the structure of a transponder information table;

BEST MODE FOR CARRYING OUT THE INVENTION

Preferred exemplary embodiments of the present invention will now be described with reference to the accompanying drawings.

First Exemplary Embodiment

Figure 1:
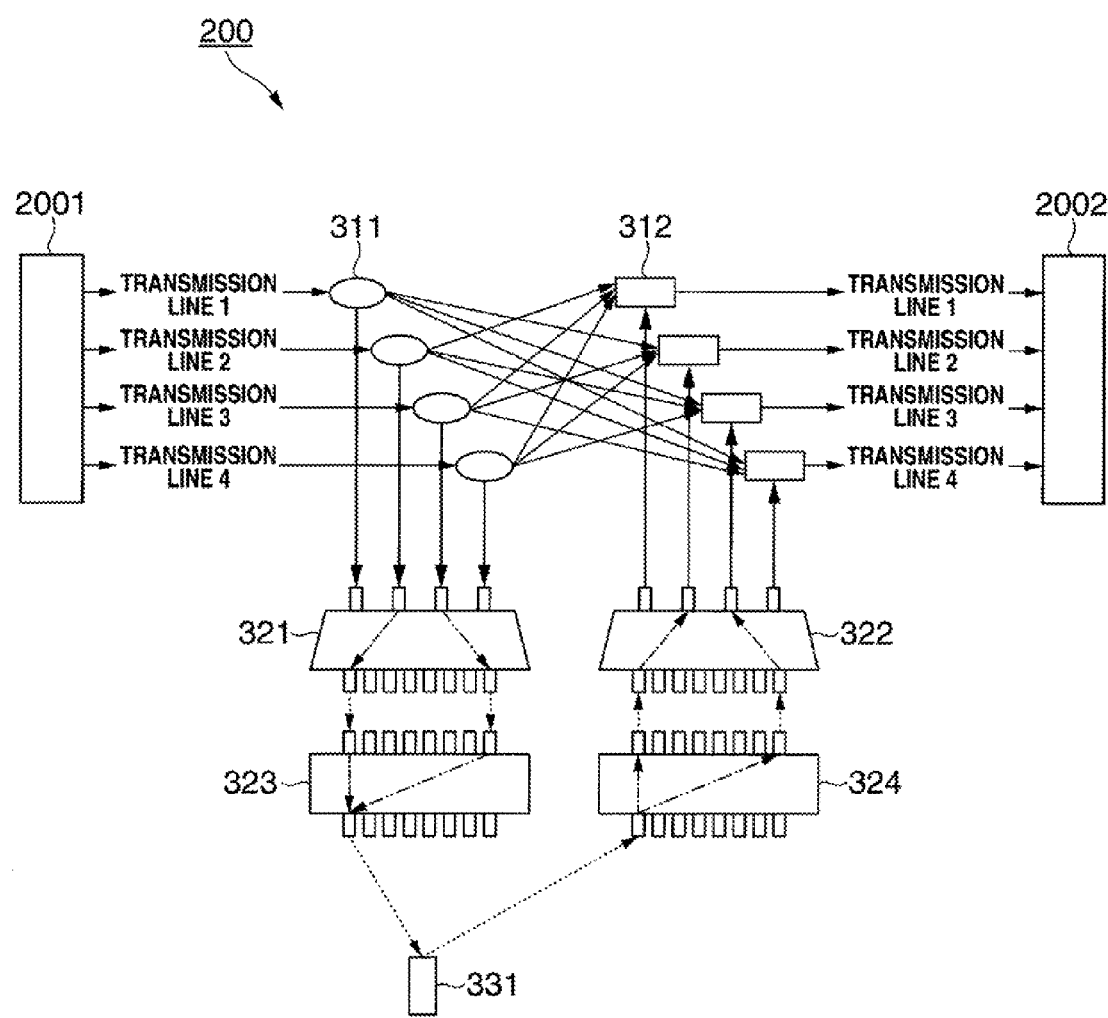
FIG. 1 is a block diagram showing the arrangement of a wavelength path communication node apparatus according to the first exemplary embodiment.

A wavelength path communication node apparatus according to the first exemplary embodiment of the present invention will be described with reference to FIG. 1. FIG. 1 is a block diagram showing the main arrangement of the wavelength path communication node apparatus according to the first exemplary embodiment of the present invention.

As shown in FIG. 1, the wavelength path communication node apparatus according to the first exemplary embodiment of the present invention includes, as main functional units, optical branching couplers 311, multiplexing system wavelength selection switches 312, a wavelength path demultiplexer 321, a wavelength path multiplexer 322, a demultiplexing system optical matrix switch 323, a multiplexing system optical matrix switch 324, and a transponder 331.

As a general arrangement, the wavelength path communication node apparatus includes a wavelength path signal receiver 2001 and wavelength path signal transmitter 2002. The wavelength path signal receiver 2001 has wavelength path reception ports connected to wavelength multiplexing transmission lines. The wavelength path signal receiver 2001 receives wavelength paths from the wavelength multiplexing transmission lines, and inputs them to the optical branching couplers 311. The wavelength path signal transmitter 2002 has wavelength path transmission ports connected to wavelength multiplexing transmission lines. The wavelength path signal transmitter 2002 transmits wavelength paths input from the multiplexing system wavelength selection switches 312 to the wavelength multiplexing transmission lines.

The first exemplary embodiment will exemplify a case in which four transmission lines are formed as wavelength multiplexing transmission lines which connect wavelength path communication node apparatuses.

The optical branching coupler 311 is arranged for each transmission line. The optical branching coupler 311 branches a wavelength input from a corresponding transmission line via the wavelength path signal receiver 2001; and inputs the branched signals to the wavelength path demultiplexer 321 and the multiplexing system wavelength selection switches 312 corresponding to transmission lines different from one corresponding to the optical branching coupler 311. In the first exemplary embodiment, the optical branching coupler 311 has one input port and M (M is an integer of 2 or more) output ports. One of the output ports is connected to the wavelength path demultiplexer 321, and (M−1) output ports are connected to the multiplexing system wavelength selection switches 312 corresponding to respective routes. The optical power branching ratio is equal for all the M output ports. Depending on the network topology, the optical power branching ratio can be set equal for (M−1) ports corresponding to the respective transmission lines while increasing or decreasing only the branching ratio for a Drop wavelength selection switch.

The multiplexing system wavelength selection switch 312 is arranged for each transmission line. The multiplexing system wavelength selection switch 312 multiplexes wavelengths input from the optical branching couplers 311 and wavelength path multiplexer 322, and sends the multiplexed wavelength to a corresponding transmission line via the wavelength path signal transmitter 2002. In the first exemplary embodiment, the multiplexing system wavelength selection switch 312 has M input ports and one output port, and has a function of multiplexing arbitrary wavelengths at arbitrary ports to a wavelength multiplexing port. The multiplexed wavelength path is output to the transmission line via the wavelength path transmission port of the wavelength path signal transmitter.

The wavelength path demultiplexer 321 and wavelength path multiplexer 322 have a plurality of wavelength demultiplexing ports and a plurality of wavelength multiplexing ports for which the connection correspondence is uniquely determined by the wavelength. The wavelength path demultiplexer 321 has wavelength multiplexing ports connected to the corresponding optical branching couplers 311, and wavelength demultiplexing ports connected to the demultiplexing system optical matrix switch 323. The wavelength path multiplexer 322 has wavelength multiplexing ports connected to the multiplexing system wavelength selection switches 312, and wavelength demultiplexing ports connected to the multiplexing system optical matrix switch 324.

The demultiplexing system optical matrix switch 323 and multiplexing system optical matrix switch 324 have a plurality of ports on the input and output sides, and perform a switching operation between the input and output ports based on an externally input signal. The demultiplexing system optical matrix switch 323 has input ports connected to the wavelength path demultiplexer 321, and output ports connected to the transponder 331 or the wavelength path transmission port of the wavelength path signal transmitter 2002. The multiplexing system optical matrix switch 324 has input ports connected to the transponder 331 or the wavelength path reception port of the wavelength path signal receiver 2001, and output ports connected to the wavelength path multiplexer 322.

The transponder 331 is connected via a communication line to a client apparatus (not shown) which performs data communication using a wavelength path of any one wavelength. The transponder 331 converts a wavelength path signal input from the demultiplexing system optical matrix switch 323 to a wavelength path transmission port into a client transmission signal, and sends the client transmission signal to the client apparatus. Also, the transponder 331 converts a client reception signal received from the client apparatus into a wavelength path signal of the foregoing wavelength, and outputs the wavelength path signal to the multiplexing system optical matrix switch 324 via a wavelength path reception port. At this time, the transponder 331 executes format conversion, calculation of an error correcting code, addition of the error correcting code, and the like for the client transmission/reception signals, generates WDM wavelength path transmission signals having arbitrary wavelengths, and performs quality monitoring, alarm management, and the like for the respective signals.

With this arrangement, according to the first exemplary embodiment, a bidirectional wavelength path to a wavelength multiplexing transmission line can be set. Neither a large-scale cross-connect switch corresponding to the maximum number of routes and the maximum number of accommodated clients, nor transponder aggregators dependent on the number of compatible routes need be arranged. The optical cross-connect switching means requires only a small switching capacity, decreasing the cost. The installation cost, apparatus size, and power consumption can be reduced in a wavelength path communication node apparatus capable of communicating a transmission/reception optical signal at a specific transponder via an arbitrary transmission route at an arbitrary wavelength.

Second Exemplary Embodiment

The second exemplary embodiment according to the present invention will be described in detail. In the second exemplary embodiment, the same reference names and numerals as those in the first exemplary embodiment denote the same parts for descriptive convenience.

<Configuration of Wavelength Multiplexing/Demultiplexing Optical Communication Network>

Figure 2:
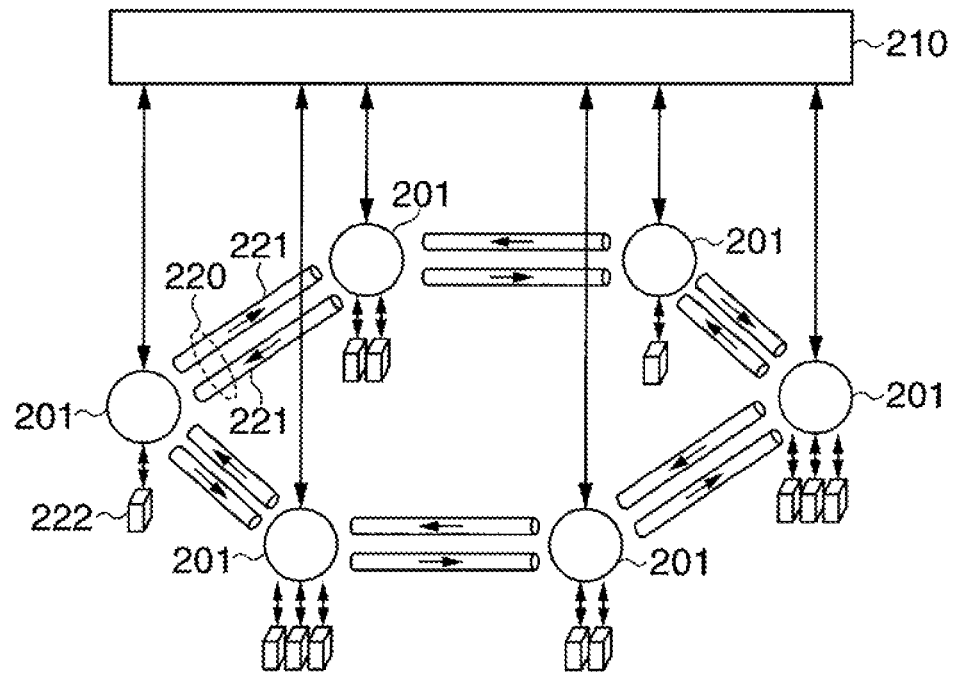
FIG. 2 is a view exemplifying a ring network in the configuration of a wavelength multiplexing/demultiplexing optical communication network according to the present invention.

FIG. 2 is a view exemplifying a ring network in the configuration of a wavelength multiplexing/demultiplexing optical communication network according to the present invention. As shown in FIG. 2, the wavelength multiplexing/demultiplexing optical communication network according to the second exemplary embodiment includes a plurality of wavelength path communication node apparatuses 201, transmission lines 220 which connect them, transponders 222 corresponding to the respective wavelength path communication node apparatuses 201, and a network control apparatus 210 which controls the respective wavelength path communication node apparatuses 201.

Figure 3:
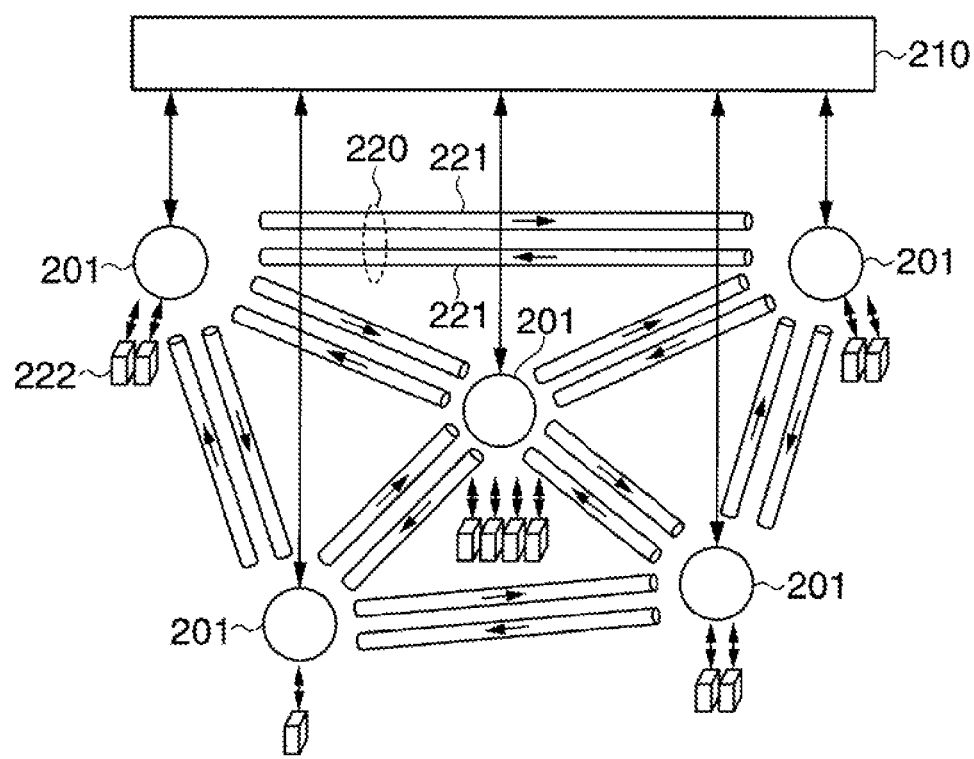
FIG. 3 is a view exemplifying a mesh network in the configuration of the wavelength multiplexing/demultiplexing optical communication network according to the present invention.

FIG. 3 is a view exemplifying a mesh network in the configuration of the wavelength multiplexing/demultiplexing optical communication network according to the present invention. The second exemplary embodiment will exemplify an application to the ring network as shown in FIG. 2. However, the network configuration is not limited to this, and the present invention is applicable to various topologies such as the mesh network as shown in FIG. 3, a tree network, and a star network.

The wavelength path communication node apparatus 201 comprises a wavelength path signal transmitter and wavelength path signal receiver as shown in FIG. 1, and executes wavelength path transmission/reception using them to perform wavelength multiplexing/demultiplexing (Add/Drop) between the accommodated transponder and the WDM network, establishing a communication path. In FIG. 2, the wavelength path communication node apparatus 201 can set clockwise and counterclockwise paths of the ring, and copes with two routes. In FIG. 3, the wavelength path communication node apparatus 201 can set paths for three routes, and copes with three routes.

The transmission line 220 includes at least a pair of optical fibers 221 which form bidirectional transmission lines. A multiplexed wavelength path signal passes through the optical fiber 221.

The transponder 222 has a client input/output interface and is connected to a client apparatus.

By transmitting/receiving control information to/from each wavelength path communication node apparatus 201, the network control apparatus 210 sets and changes point-to-point bidirectional communication and point-to-multipoint unidirectional communication between arbitrary wavelength path communication node apparatuses 201 using wavelength paths. The network control apparatus 210 detects fault information in the wavelength path communication node apparatus 201, and sets a wavelength path which avoids the wavelength path communication node apparatus 201 having a fault. The network control apparatus 210 receives, from each wavelength path communication node apparatus 201, a wavelength path setting which covers a plurality of wavelength path communication node apparatuses 201, and fault information for performing fault restoration or the like. Also, the network control apparatus 210 transmits wavelength path setting information to each wavelength path communication node apparatus 201.

<<Arrangement of Wavelength Path Communication Node Apparatus>>

Figure 4:
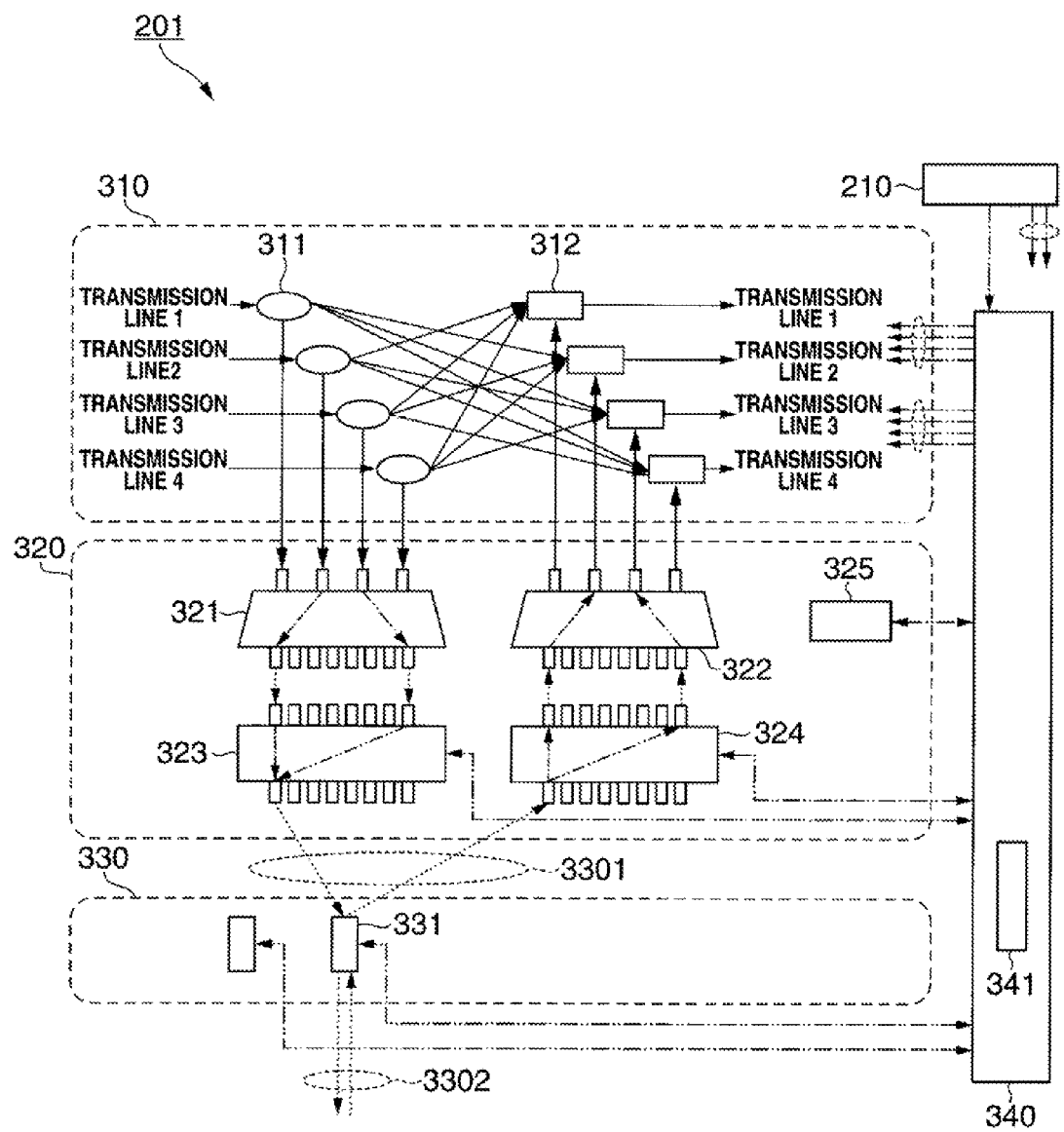
FIG. 4 is a block diagram showing the arrangement of a wavelength path communication node apparatus according to the second exemplary embodiment.

The arrangement of the wavelength path communication node apparatus 201 will be described in detail with reference to FIG. 4. FIG. 4 is a block diagram showing the arrangement of the node apparatus according to the second exemplary embodiment.

As shown in FIG. 4, the wavelength path communication node apparatus 201 includes a WDM line unit 310, transponder aggregator unit 320, transponder pool unit 330, and node controller 340. As described above, the wavelength path communication node apparatus 201 also includes a wavelength path signal transmitter and wavelength path signal receiver (neither is shown).

The wavelength path communication node apparatus 201 shown in FIG. 4 has a configuration capable of establishing communication paths for a=4 routes, and can cope with route expansion up to M routes. Assume that the transmission line can perform wavelength multiplexing transmission of a maximum of N wavelengths. An operating system can communicate a maximum of N wavelength path signals. In the second exemplary embodiment, the number of routes and the wavelength multiplexing number of the transmission line are not limited.

(WDM Line Unit)

The WDM line unit 310 includes optical branching couplers 311 and multiplexing system wavelength selection switches 312.

The optical branching coupler 311 has one input port and M (M is an integer of 2 or more) output ports. One of the output ports is connected to a wavelength path demultiplexer 321 (to be described later), and (M−1) output ports are connected to the multiplexing system wavelength selection switches 312 corresponding to respective routes. The optical power branching ratio is equal for all the M output ports. Depending on the network topology, the optical power branching ratio can be set equal for (M−1) ports of the respective transmission lines while increasing or decreasing only the branching ratio for a Drop wavelength selection switch.

Figure 5:
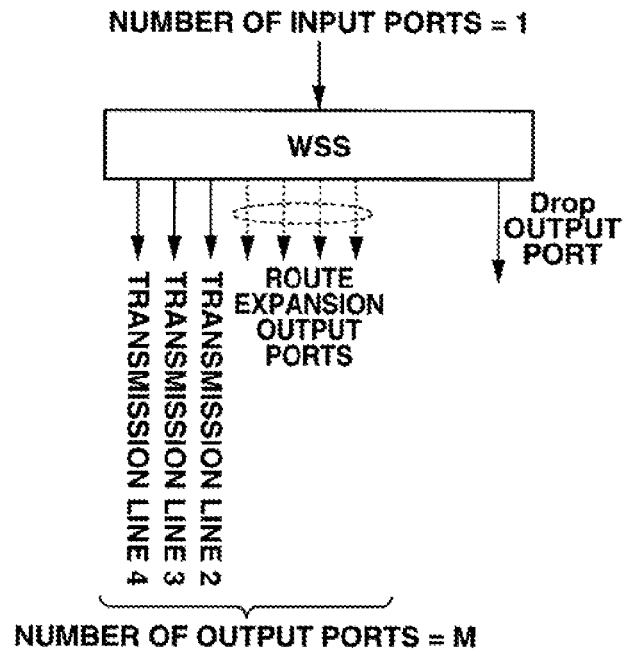
FIG. 5 is a view exemplifying the arrangement of a wavelength selection switch.

FIG. 5 is a view exemplifying the arrangement of a wavelength selection switch. The optical branching coupler 311 may be replaced with a wavelength selection switch 2491 shown in FIG. 5.

The use of the optical branching coupler 311 has the following effects. For example, the optical power of a wavelength entering a node from transmission line 1 via the wavelength path signal receiver can be branched at the node to all transmission lines except for transmission line 1, that is, the wavelength path can be broadcast. The transmission band characteristic hardly depends on the wavelength (there is no transmission degradation factor such as filter constriction). The apparatus cost can be reduced.

However, a larger number of optical power branches decreases the branched optical power and shortens the transmission distance. The insertion loss of a known wavelength selection switch (WSS) has a typical value of about 6 dB, and the branch loss at a five-branch coupler is about 7 dB. If the maximum number of branches is 5 (M=5) or more, the wavelength selection switch can be applied to reduce the loss at the route branch.

As shown in FIG. 5, the wavelength selection switch 2491 has one input port and M output ports. The output ports include one Drop output port, (a−1) transmission line connection ports, and (M−((a−1)+1)=M−a) route expansion output ports. When the wavelength selection switch 2491 is applied to the wavelength path communication node apparatus 201 in FIG. 4, a=4, so three ports serve as transmission line connection output ports, and four ports serve as route expansion output ports. The wavelength selection switch has a function of demultiplexing an arbitrary wavelength in a WDM signal input from the input port to an arbitrary Drop port.

Figure 6:
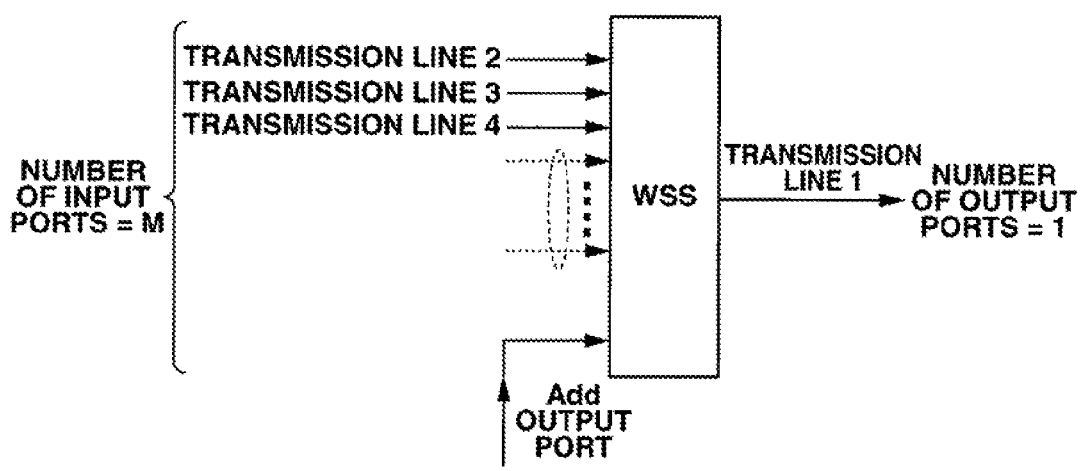
FIG. 6 is a view exemplifying the arrangement of a wavelength selection switch.

FIG. 6 is a view exemplifying the arrangement of a wavelength selection switch. As shown in FIG. 6, the multiplexing system wavelength selection switch 312 has M input ports and one output port. The input ports include (a−1) transmission line input ports, (M−((a−1)+1)=M−a) route expansion input ports, and one Add input port. In FIG. 4, a=4, so three ports serve as transmission line connection input ports, and four ports serve as route expansion input ports. The multiplexing system wavelength selection switch 312 has a function of multiplexing arbitrary wavelengths at arbitrary ports to a wavelength multiplexing port. The multiplexed wavelength path is output to the transmission line 220 via the wavelength path transmission port of the wavelength path signal transmitter.

(Transponder Aggregator Unit)

The transponder aggregator unit 320 has a wavelength path multiplexing function of multiplexing the wavelengths of wavelength path signals received from a transponder 331 into a WDM signal, and a wavelength path demultiplexing function of demultiplexing a WDM signal into individual wavelength path signals and transmitting them to the transponder 331. The transponder aggregator unit 320 includes a wavelength path demultiplexer 321, wavelength path multiplexer, demultiplexing system optical matrix switch 323, multiplexing system optical matrix switch 324, and wavelength multiplexer/demultiplexer unit port connection correspondence table 325.

FIG. 7A is a view showing the arrangement of a wavelength multiplexer/demultiplexer unit. FIG. 7B is a table showing the relationship between the wavelength and the wavelength multiplexing port in the wavelength multiplexer/demultiplexer unit in FIG. 7A. FIG. 7C is a table for N=40 in FIG. 7B.

As shown in FIG. 7A, the wavelength path demultiplexer 321 and a wavelength path multiplexer 322 include a plurality of wavelength demultiplexing ports and a plurality of wavelength multiplexing ports. FIG. 7B shows the relationship between a wavelength assigned to a wavelength demultiplexing port, and a wavelength multiplexing port with connection correspondence having a wavelength routing characteristic. In this case, eight wavelengths are multiplexed to a wavelength multiplexing port using eight wavelength demultiplexing ports and eight wavelength multiplexing ports. For example, when λ1 is input to DMUX#1, λ2 is input to DMUX#2, . . . , λ8 is input to DMUX#8, all the input wavelengths are output from the wavelength multiplexing port MUX#1. FIG. 7C shows a case in which the number of wavelength demultiplexing ports is N=40.

The wavelength path demultiplexer 321 and wavelength path multiplexer have the same function. In an arrangement having eight wavelength demultiplexing ports and eight wavelength multiplexing port, an input eight-wavelength-multiplexed WDM signal is demultiplexed into individual wavelengths, which are output to the respective wavelength demultiplexing ports. This correspondence can be obtained from the relationship between DMUX and MUX in FIGS. 7B and 7C. Note that the correspondence between the wavelength demultiplexing port and the wavelength multiplexing port for a specific wavelength is not limited to the above-described relationship based on the wavelength routing characteristic, and may be another correspondence. However, the connection correspondence between the wavelength demultiplexing port and the wavelength multiplexing port needs to be uniquely determined by the wavelength.

The demultiplexing system optical matrix switch 323 and multiplexing system optical matrix switch 324 have a plurality of ports on the input and output sides, and perform a switching operation between the input and output ports based on an externally input signal. Note that the demultiplexing system optical matrix switch 323 and multiplexing system optical matrix switch 324 communicate with the transponder 331 via the above-mentioned wavelength path signal transmitter and wavelength path signal receiver (neither is shown). More specifically, when transmitting a wavelength path to the transponder 331, the output port is connected to the wavelength path transmission port of the wavelength path signal transmitter. When receiving a wavelength path from the transponder 331, the input port is connected to the wavelength path reception port of the wavelength path signal receiver.

The wavelength multiplexer/demultiplexer unit port connection correspondence table 325 defines the connection correspondence between the wavelength demultiplexing ports and wavelength multiplexing ports of the wavelength path demultiplexer 321 and wavelength path multiplexer 322 in regard to the wavelength, as shown in FIGS. 7B and 7C or the like.

In the second exemplary embodiment, the wavelength multiplexer/demultiplexer unit port connection correspondence table 325 is arranged in the transponder aggregator unit 320. However, the portion where the wavelength multiplexer/demultiplexer unit port connection correspondence table 325 is arranged is not limited to the transponder aggregator unit 320. The wavelength multiplexer/demultiplexer unit port connection correspondence table 325 can be freely arranged in the node controller 340 or the like within the network control apparatus 210.

(Transponder Pool Unit)

Figure 8:
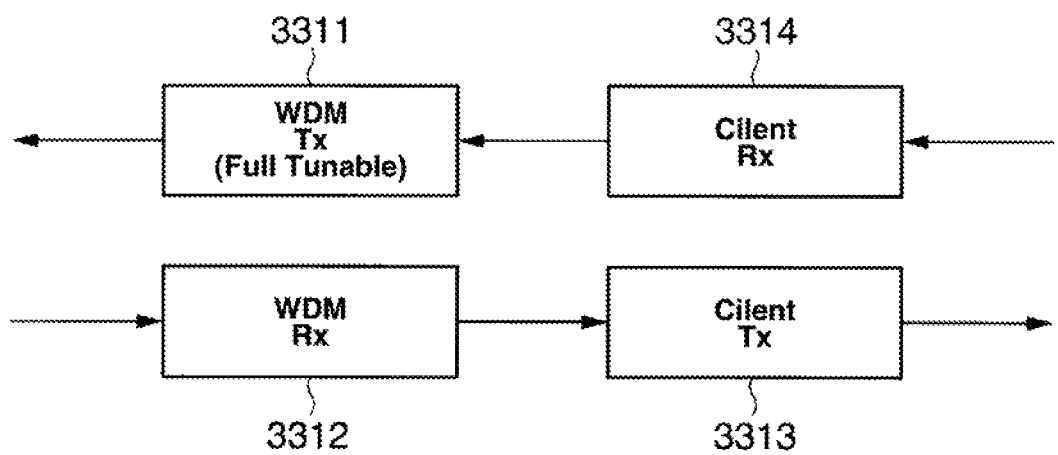
FIG. 8 is a block diagram exemplifying a transponder.

FIG. 8 is a block diagram exemplifying the transponder. The transponder pool unit 330 is formed from a plurality of transponders each including a device shown in FIG. 8. These transponders are used in an operating system, spare system, and the like, or are not in use without assigning any specific service. The node controller 340 manages information about these states. In FIG. 4, reference numeral 3301 denotes a wavelength path signal of the transponder 331; and 3302, a client signal.

The transponder 331 executes format conversion, calculation of an error correcting code, addition of the error correcting code, and the like for the client signal 3302, generates WDM wavelength path transmission signals having arbitrary wavelengths, and performs quality monitoring, alarm management, and the like for the respective signals. In general, the client signal uses a specific wavelength such as 1.5 µm, and the wavelength path signal has a transmission quality enough to cope with WDM long-distance transmission. For example, an arbitrary wavelength is selected from ITU-T grid-compatible wavelengths, and a signal is transmitted/received using a stable wavelength at high precision (a full tunable transponder for transmitting a WDM wavelength path signal of an arbitrary wavelength will be simply referred to as a transponder). Note that the transponder 331 may be replaced with a device having a WDM wavelength path signal transmitter 3311, WDM wavelength path signal receiver 3312, client signal transmitter 3313, and client signal receiver 3314, as shown in FIG. 8.

Note that the transponder 331 in the transponder pool unit 330 is one of a plurality of transponders. The wavelength path communication node apparatus 201 shown in FIG. 4 can accommodate a maximum of N transponders. All the transponders in the transponder pool unit 330 and the ports of the wavelength path demultiplexer 321 and wavelength path multiplexer 322 are permanently connected by optical fibers, and a manual change of the connection or the like is not assumed.

(Node Controller)

The node controller 340 executes switch setting control for the multiplexing system wavelength selection switch 312 (including a demultiplexing system wavelength selection switch 1301 to be described later with reference to FIG. 12), switch setting control for the demultiplexing system optical matrix switch 323 and multiplexing system optical matrix switch 324 (including client system optical matrix switches 351 and 352 to be described later with reference to FIG. 11), detection of a transponder fault, wavelength path multiplexer/demultiplexer fault, and optical matrix switch fault, transmission wavelength setting for the transponder, and the like. The node controller 340 includes a transponder information table 341.

FIG. 9 is a table exemplifying the structure of the transponder information table. As shown in FIG. 9, the transponder information table 341 stores the transponder identification number (TPND ID), the optical matrix switch connection port number, the wavelength path transmission line numbers of operating and spare systems, the operating system wavelength path wavelength, and the transponder identification number and optical matrix switch connection port number of the spare system shared transponder. These pieces of information are transmitted via the network control apparatus 210 or the like or directly to the individual node controller 340, and stored in the transponder information table 341.

<Connection Between Building Components of Wavelength Path Communication Node Apparatus>

In the WDM line unit 310, the optical branching coupler 311 inputs a WDM signal from each transmission, line to the wavelength path demultiplexer 321 via one output port, and the multiplexing system wavelength selection switches 312 corresponding to all routes other than the transmission line of the optical branching coupler 311 via (M−1) output ports.

In the transponder aggregator unit 320, the ports (MUX#1 to MUX#8 in FIG. 7A) of the wavelength path demultiplexer 321 and wavelength path multiplexer where multiplexed wavelengths corresponding to the respective transmission lines are handled are connected to the optical branching couplers 311 and multiplexing system wavelength selection switches 312, respectively.

The ports (DMUX#1 to DMUX#8 in FIG. 7A) of the wavelength path demultiplexer 321 and wavelength path multiplexer 322 where demultiplexed wavelengths are handled are permanently connected to the ports of the demultiplexing system optical matrix switch 323 and multiplexing system optical matrix switch 324, respectively. The other ports of the demultiplexing system optical matrix switch 323 and multiplexing system optical matrix switch 324 are connected to a plurality of transponders 331.

<Operation of Wavelength Path Communication Node Apparatus>

The operation of the wavelength path communication node apparatus 201 will be described.

When the client signal 3302 is externally input to the client interface, the transponder 331 generates a wavelength path transmission signal by converting the client signal 3302 into a wavelength designated in the transponder information table 341 in a signal format suited to long-distance transmission. Based on the wavelength path transmission signal, the demultiplexing system optical matrix switch 323 and multiplexing system optical matrix switch 324 set a wavelength path. This operation will be explained below. Note that the second exemplary embodiment will exemplify a case in which a wavelength path having wavelength λ2 is set on transmission line #2 for a client signal input to the transponder 331. The network apparatus operation manager sets and manages the transponder, wavelength path setting transmission line number, and wavelength based on the transponder information table 341 shown in FIG. 9 in the network control apparatus 210 or node controller 340.

<<Wavelength Path Setting Operation on Multiplexing Side>>

The demultiplexing system optical matrix switch 323 performs a switch setting operation to set a wavelength path in the wavelength path communication node apparatus 201 that is to be added from the transponder 331 to a WDM transmission line. More specifically, the node controller 340 sets the port of the demultiplexing system optical matrix switch 323 by looking up the wavelength multiplexer/demultiplexer unit port connection correspondence table 325 and transponder information table 341.

For example, in the transponder information table 341 shown in FIG. 9, the transponder 331 is connected to transponder-side port #1 of the demultiplexing system optical matrix switch 323. Also, the transponder information table 341 designates to operate the transponder 331 at λ2 for transmission line #2. In the wavelength multiplexer/demultiplexer unit port connection correspondence table 325 shown in FIG. 7B, the DMUX port number of the wavelength path multiplexer 322 that should be selected to set a wavelength path at λ2 on transmission line #2 (MUX#2) is DMUX#1. From this, the node controller 340 controls the demultiplexing system optical matrix switch 323 to connect transponder-side port #1 to wavelength multiplexer/demultiplexer unit-side port #1.

In the second exemplary embodiment, by looking up the wavelength multiplexer/demultiplexer unit port connection correspondence table 325, the DMUX port number of the wavelength path multiplexer 322 is specified from a wavelength path transmission line and wavelength to be set for a specific transponder. The demultiplexing system optical matrix switch 323 is so set as to establish connection with the transponder-side port.

<<Wavelength Path Setting Operation on Demultiplexing Side>>

The node controller 340 performs a switch setting operation for the transponder 331 to set a wavelength path in the wavelength path communication node apparatus until a component having wavelength λ2 is dropped from the WDM transmission line and received by the transponder 331. More specifically, the node controller 340 sets the port of the demultiplexing system optical matrix switch 323 by looking up the wavelength multiplexer/demultiplexer unit port connection correspondence table 325 and transponder information table 341.

For example, the transponder information table 341 shown in FIG. 9 designates to operate the transponder 331 at wavelength λ2 for transmission line #2. A component (to be referred to as a wavelength path signal) having wavelength λ2 corresponding to transmission line #2 (MUX#2) out of control information communicated via the WDM transmission line is branched by the optical branching coupler 311 and input to the wavelength path demultiplexer 321. FIG. 7B reveals that a wavelength path signal having λ2 input from MUX#2 is output to DMUX#1. The wavelength path signal having λ2 output from DMUX#1 is input to wavelength multiplexer/demultiplexer unit-side port #1 of the demultiplexing system optical matrix switch 323 via a connection fixed in advance using an optical fiber. By looking up again the transponder information table 341 shown in FIG. 9, wavelength multiplexer/demultiplexer unit-side port #1 is connected to transponder-side port #1 of the connected demultiplexing system optical matrix switch 323 to which the transponder 331 is connected. Hence, the node controller 340 sets the demultiplexing system optical matrix switch 323 to establish connection between wavelength multiplexer/demultiplexer unit-side port #1 of the demultiplexing system optical matrix switch 323 and the transponder 331.

<<Wavelength Path Attribute Change Operation>>

The wavelength path of the above-described wavelength path signal is sometimes changed in response to a transmission line fault, wavelength selection switch fault, wavelength path reconfiguration request, or the like. This change operation will be explained below.

Figure 10:
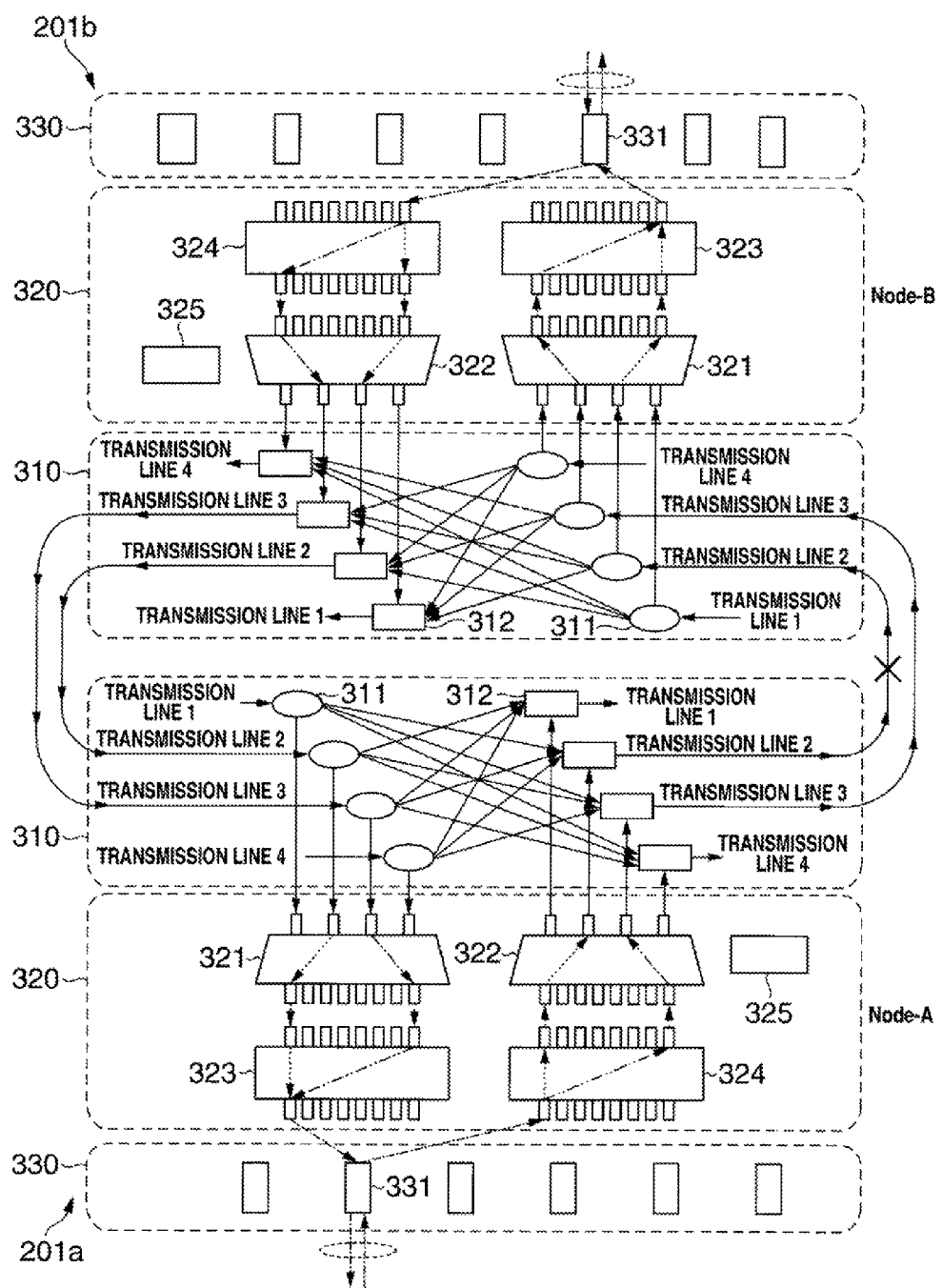
FIG. 10 is a block diagram exemplifying a state in which intercommunication is performed between two wavelength path communication node apparatuses.

FIG. 10 is a block diagram exemplifying a state in which intercommunication is performed between two wavelength path communication node apparatuses. The second exemplary embodiment will exemplify a case in which Node-A 201a and Node-B 201b each formed from the wavelength path communication node apparatus 201 perform intercommunication using the transponders 331, a fault occurs on transmission line #2, and the path is switched to that of another transmission line, as shown in FIG. 10. In this case, assume that the network control apparatus 210 or the like ensures in advance a spare system wavelength path for an operating wavelength path and the spare system wavelength path is paired with the operating system one, or the network control apparatus 210 or the like sets a spare system wavelength path. Also, assume that, even when another relay wavelength path communication node apparatus 201 (not shown) exists, the network control apparatus 210 or the like sets a spare system wavelength path. Further, assume that the transmission line and use wavelength of the spare system wavelength path for the operating system are set in advance in the transponder information table 341.

When a fault occurs on transmission line #2 between the Node-A 201a and the Node-B 201b, as shown in FIG. 10, the transponder 331 of the Node-B 201b detects the LOS (Loss of Frame) of a wavelength path signal or another alarm, and notifies the transponder 331 of the Node-A using a intercommunication path that the fault has occurred on the transmitting-side path. This function is equivalent to, for example, BDI (Backward Defect Indication) for an ITU-T G.709 OTN frame.

After recognizing the generation of the fault, the node controller 340 of the Node-A 201a looks up the transponder information table 341 to confirm that transmission line #3 is set as a spare system wavelength path. Further, the node controller 340 looks up the wavelength multiplexer/demultiplexer unit port connection correspondence table 325 to confirm that MUX#3 is a wavelength multiplexing port of the wavelength path multiplexer 322 that corresponds to transmission line #3, and DMUX#8 is a wavelength demultiplexing port capable of outputting a wavelength path signal at wavelength λ2 to wavelength multiplexing port MUX#3 of the wavelength path multiplexer 322.

In accordance with this, the demultiplexing system optical matrix switch 323 of the Node-A 201a switches the wavelength path signal of the transponder 331 from wavelength demultiplexer/multiplexer unit-side port #1 to port #8. Then, the transponder 331 switches to a wavelength path on transmission line #3 at transmission wavelength λ2.

The Node-B 201b notifies the node controller 340 that the transponder 331 has detected the LOS. The node controller 340 looks up the transponder information table 341 and wavelength multiplexer/demultiplexer unit port connection correspondence table 325 to specify that transmission line #3 is designated as the spare system of the transponder 331 and #8 is a DMUX port of the wavelength path demultiplexer 321 that corresponds to wavelength λ2. Also, the node controller 340 looks up the transponder information table 341 to confirm that the transponder 331 is connected to transponder-side port #1 of the demultiplexing system optical matrix switch 323. The node controller 340 controls to establish connection with wavelength multiplexer/demultiplexer unit-side port #8 of the demultiplexing system optical matrix switch 323 by using the detection of the LOS as a trigger.

With the above-described arrangement, according to the second exemplary embodiment, a bidirectional wavelength path to a wavelength multiplexing transmission line can be set. Neither a large-scale cross-connect switch corresponding to the maximum number of routes and the maximum number of accommodated clients, nor transponder aggregators dependent on the number of compatible routes need be arranged. The optical cross-connect switching means requires only a small switching capacity, decreasing the cost. The installation cost, apparatus size, and power consumption can be reduced in a wavelength path communication node apparatus capable of communicating a transmission/reception optical signal at a specific transponder via an arbitrary transmission route at an arbitrary wavelength.

In a conventional node apparatus arrangement using a transponder in which a WDM optical transmitter and receiver, and a client optical transmitter and receiver are mounted as one functional unit in a card or the like, no spare system transponder can be spared. For example, in an arrangement in which an optical transmitter and optical receiver are separated, as shown in FIGS. 5(c), 6(a), and 6(b) of reference 2, a spare system optical transmitter and spare system optical receiver can be shared. However, fault recovery cannot be done using a combination of a specific optical transmitter and optical receiver in the operating and spare systems, i.e., a combination assuming a transponder.

However, according to the second exemplary embodiment, wavelength path multiplexing/demultiplexing means and optical matrix switches are arranged on both the wavelength path transmitting side and wavelength path receiving side. Further, an information table regarding the operation of the transponder, a means for storing the input/output port correspondence depending on the wavelength of the wavelength path multiplexing/demultiplexing means, a means for storing the switch setting state of the optical matrix switching means, and each fault detection means are arranged. After a fault is detected, switching to a wavelength path in the wavelength path communication node apparatus using a spare system resource can be implemented by referring to pieces of information in the information table and storage means. In bidirectional wavelength path communication using the transponder, the apparatus reliability can be increased by sharing the spare system of the transponder and client accommodation functional unit.

By arranging the wavelength path multiplexing/demultiplexing means and optical matrix switching means, the optical switching function can be divided into a larger number of switches than in a conventional arrangement, and a redundant configuration in which the spare system is shared can be obtained. This can reduce the redundancy cost of the wavelength path communication node apparatus.

The optical cross-connect switching means requires only a small switching capacity, and thus the number of switching stages can be decreased. The apparatus size and power consumption can be decreased by applying an integrated waveguide device technique.

In the second exemplary embodiment, the wavelength does not change in switching from the operating system to the spare system. However, the above description also applies to a case in which the transmission wavelength of the wavelength path changes depending on the transponder.

The second exemplary embodiment has assumed fault generation and fault recovery on a wavelength path in only one direction and no fault generation on the counter side. However, the second exemplary embodiment also applies to a case in which the path is also changed on the counter side.

In the second exemplary embodiment, the operating system changes to the spare one. However, the second exemplary embodiment also applies to a case in which the network control apparatus 210 changes the transmission line or wavelength to another one while maintaining the operating system.

Third Exemplary Embodiment

The third exemplary embodiment according to the present invention will be described. In the third exemplary embodiment, a client system optical matrix switch unit 350 is further arranged in the wavelength path communication node apparatus 201 described with reference to FIG. 4. In the third exemplary embodiment, the same reference names and numerals as those in the second exemplary embodiment denote the same parts, and a detailed description thereof will not be repeated.

<Arrangement of Wavelength Path Communication Node Apparatus>

Figure 11:
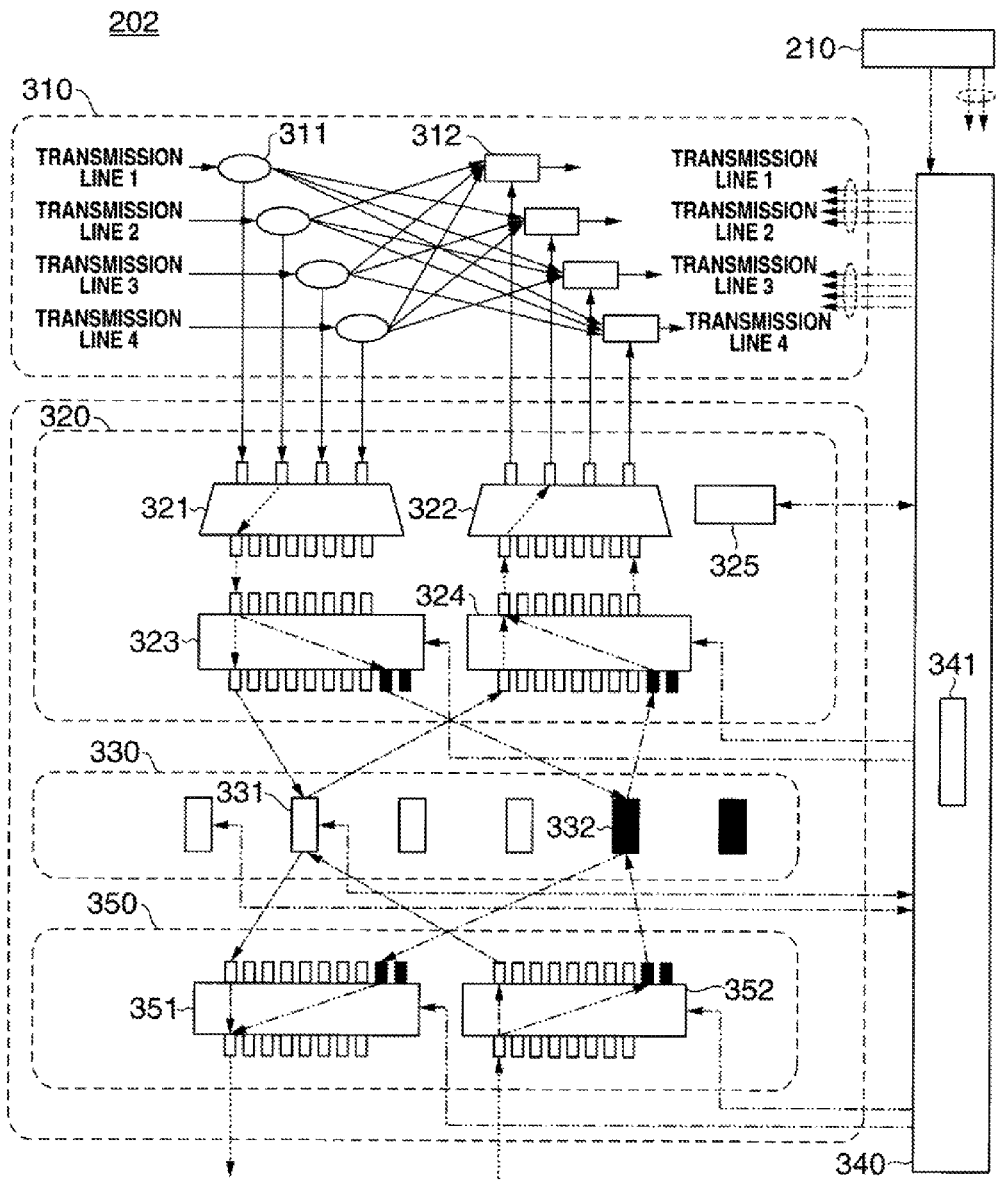
FIG. 11 is a block diagram showing the arrangement of a wavelength path communication node apparatus according to the third exemplary embodiment.

FIG. 11 is a block diagram showing the arrangement of a wavelength path communication node apparatus according to the third exemplary embodiment of the present invention. As shown in FIG. 11, a wavelength path communication node apparatus 202 according to the third exemplary embodiment includes a WDM line unit 310, a transponder aggregator unit 320, a transponder pool unit 330, a node controller 340, and the client system optical matrix switch unit 350.

<<Arrangement of Client System Optical Matrix Switch Unit>>

The client system optical matrix switch unit 350 includes client system optical matrix switches 351 and 352 which are controlled by the node controller 340.

The client system optical matrix switches 351 and 352 have the number of ports and a switching capacity enough to perform non-blocking switching with respect to the number of transponders arranged in the transponder pool unit 330. When the number of mounted transponders is N, each of the client system optical matrix switches 351 and 352 has an N×N switching capacity. When all N transponders operate as an operating system and α spare system transponders are separately arranged, each of the client system optical matrix switches 351 and 352 has a (N+α: wavelength path signal connection ports)×(N: client signal connection ports) switching capacity. Each of the wavelength path demultiplexer 321 and wavelength path multiplexer 322 needs to have N+α ports on the transponder accommodation side.

<Operation of Wavelength Path Communication Node Apparatus>

The operation of the wavelength path communication node apparatus 202 according to the third exemplary embodiment will be described with reference to FIG. 11. Note that operations of setting a wavelength path and changing the path are the same as those in the first exemplary embodiment.

An operation when a transponder fault occurs during communication using an operating system transponder 331 and the wavelength path communication node apparatus 202 recovers from the communication fault using a spare system transponder 332 will be explained.

When it is detected that a fault has occurred in the transponder 331, the node controller 340 looks up a transponder information table 341 to confirm a spare system transponder. For example, in the transponder information table 341 shown in FIG. 9, the transponder 332 is registered as a shared spare system transponder, and #9 is registered as a route wavelength switching/client system optical matrix switch connection port number. After confirming these pieces of information, the node controller 340 controls the client system optical matrix switches 351 and 352 to switch the transponder-side ports from #1 to #9, thereby switching the client signal connection from the operating system transponder 331 to the spare system transponder 332.

Also, the node controller 340 looks up the transponder information table 341 to confirm the port and wavelength of the transponder 331 suffering the fault, and the connection port of the spare system transponder 332. It is registered in the transponder information table 341 shown in FIG. 9 that the transponder 331 is connected to port #1 of the route wavelength switching/client system optical matrix switch, the transmission wavelength is λ2, and the spare system transponder 332 is connected to port #9.

After confirming these pieces of information, the node controller 340 sets a WDM transmission wavelength and the selection ports of a demultiplexing system optical matrix switch 323 and multiplexing system optical matrix switch 324 so that the spare system transponder 332 implements an operation equivalent to that of the operating system transponder 331, i.e., fault recovery is achieved. More specifically, the node controller 340 changes switch settings to set λ2 as the WDM transmission wavelength of the spare system transponder 332, and establish connection between port #9 and the selection ports of the demultiplexing system optical matrix switch 323 and multiplexing system optical matrix switch 324 on the transponder sides without changing their selection ports respectively on the sides of the wavelength path demultiplexer 321 and wavelength path multiplexer 322 from the operating system ports.

According to the third exemplary embodiment, when a fault occurs in the operating system transponder 331, communication can be recovered using the spare system transponder 332.

Fourth Exemplary Embodiment

Figure 13:
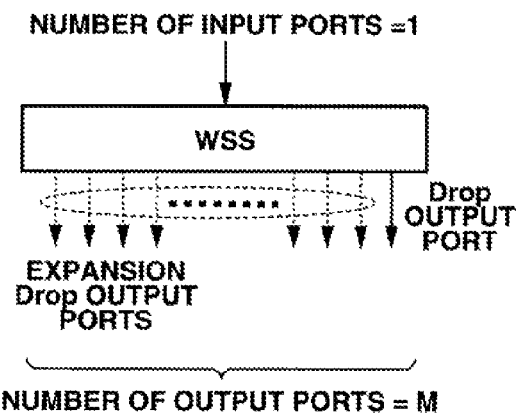
FIG. 13 is a view exemplifying a wavelength selection switch.
Figure 14:
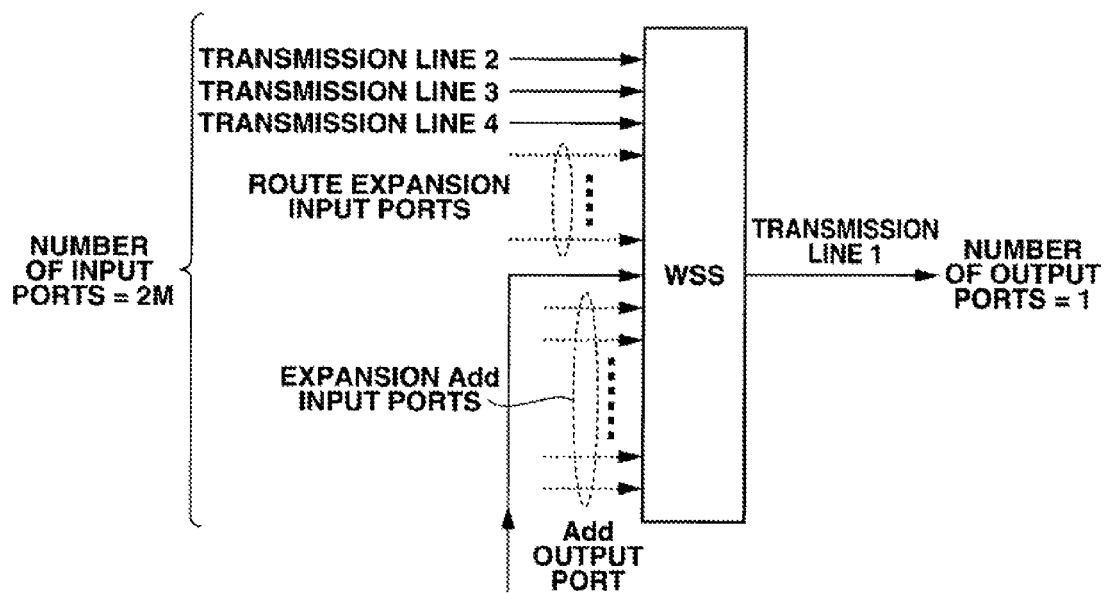
FIG. 14 is a view exemplifying a wavelength selection switch.

The fourth exemplary embodiment according to the present invention will be described. FIG. 12 is a block diagram showing the arrangement of a wavelength path communication node apparatus according to the fourth exemplary embodiment. FIG. 13 is a view exemplifying a wavelength selection switch. FIG. 14 is a view exemplifying a wavelength selection switch.

In the fourth exemplary embodiment, each demultiplexing system wavelength selection switch 1301 shown in FIG. 13 is connected to the Drop port of the WDM line unit 310 in the wavelength path communication node apparatus 201 described with reference to FIG. 11. In addition, each multiplexing system wavelength selection switch 1401 shown in FIG. 14 replaces the multiplexing system wavelength selection switch 312. In the fourth exemplary embodiment, the same reference names and numerals as those in the third exemplary embodiment denote the same parts, and a detailed description thereof will not be repeated.

<Arrangement of Wavelength Path Communication Node Apparatus>

Figure 12:
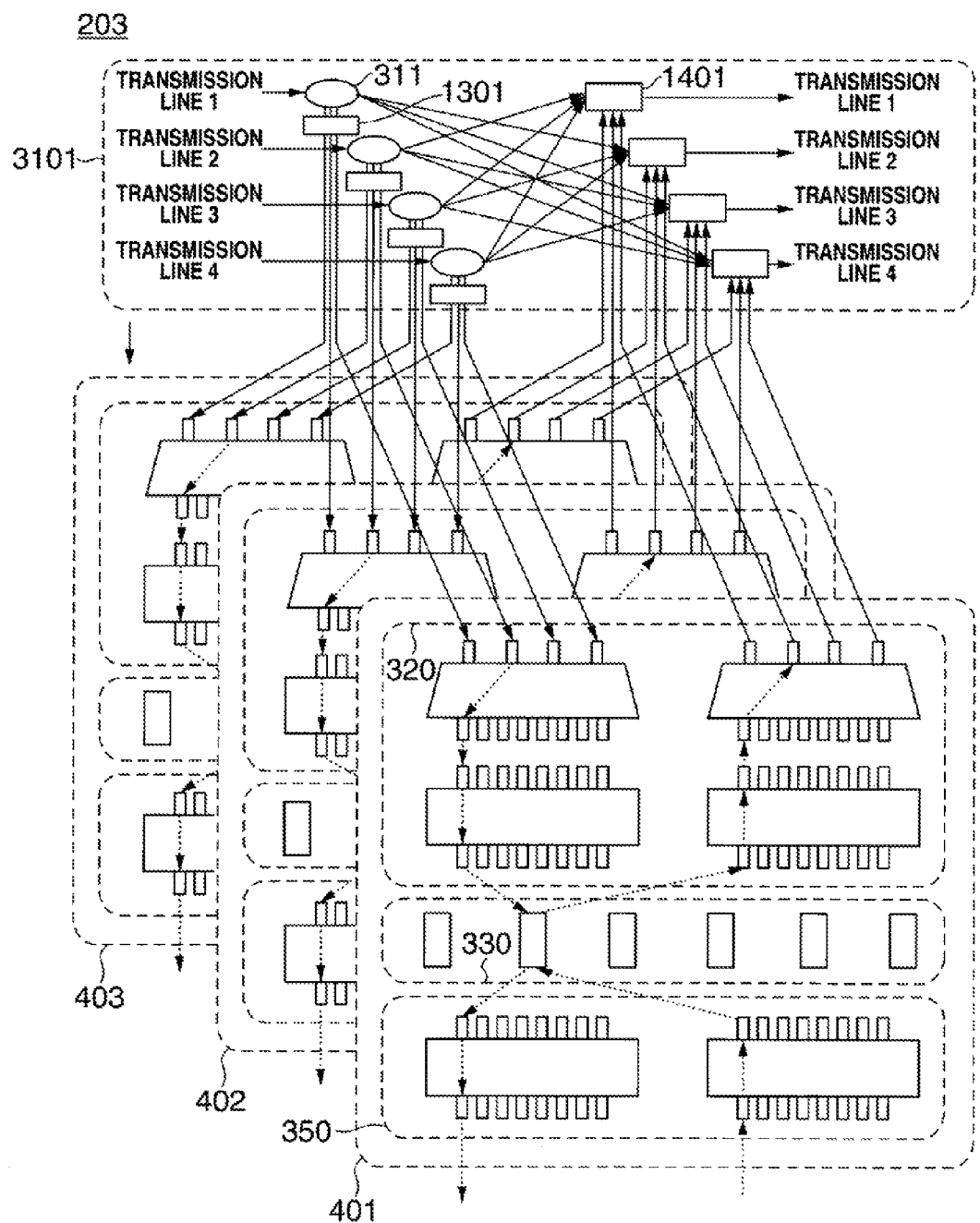
FIG. 12 is a block diagram showing the arrangement of a wavelength path communication node apparatus according to the fourth exemplary embodiment.

As shown in FIG. 12, a wavelength path communication node apparatus 203 according to the fourth exemplary embodiment includes a WDM line unit 3101, and a plurality of client accommodation functional units 400 each having a transponder aggregator unit 320, transponder pool unit 330, node controller 340, and client system optical matrix switch unit 350. In the fourth exemplary embodiment, three client accommodation functional units 400 are arranged, and respectively denoted by reference numerals 401 to 403 in FIG. 12.

<<Arrangement of WDM Line Unit>>

The WDM line unit 3101 includes optical branching couplers 311, the demultiplexing system wavelength selection switches 1301, and the multiplexing system wavelength selection switches 1401.

As shown in FIG. 13, the demultiplexing system wavelength selection switch 1301 has output ports corresponding to the maximum expansion number of transponder aggregator units. The number of ports equals the sum of the number of operating Drop ports and that of expansion Drop ports.

As shown in FIG. 14, the multiplexing system wavelength selection switch 1401 is configured by adding expansion Add input ports to the above-described multiplexing system wavelength selection switch 312.

In the fourth exemplary embodiment, the client accommodation functional unit 400 is added as one expansion unit to the wavelength path communication node apparatus 202 described with reference to FIG. 11. The wavelength multiplexing ports of wavelength path demultiplexers 321 and wavelength path multiplexers 322 in the client accommodation functional units 402 and 403 are connected to ports ensured as expansion Drop ports and expansion Add ports in the demultiplexing system wavelength selection switch 1301 and multiplexing system wavelength selection switch 1401 of the WDM line unit 310.

The client accommodation functional unit 400 can, therefore, be added as an expansion unit in accordance with an increase in the number of routes of the WDM line unit 3101 and an increase in the number of accommodated clients.

The client accommodation functional unit 400 can incorporate only the number of transponders necessary to add the client accommodation functional unit 400. As the number of accommodated clients increases, transponders can be added until they reach the maximum number of accommodated transponders in the client accommodation functional unit. These transponders can set wavelength paths at arbitrary wavelengths for arbitrary routes (excluding an operation in which different transponders set wavelength paths at the same wavelength for the same transmission line).

In FIG. 12, the three client accommodation functional units 401 to 403 are arranged. However, the number of client accommodation functional units is not limited to this, and can be increased up to the number of expansion Add/Drop ports ensured in each of the demultiplexing system wavelength selection switch 1301 and multiplexing system wavelength selection switch 1401.

Fifth Exemplary Embodiment

The fifth exemplary embodiment according to the present invention will be described. In the fifth exemplary embodiment, the same reference names and numerals as those in the first to fourth exemplary embodiments denote the same parts, and a detailed description thereof will not be repeated.

<Arrangement of Wavelength Path Communication Node Apparatus>

Figure 15:
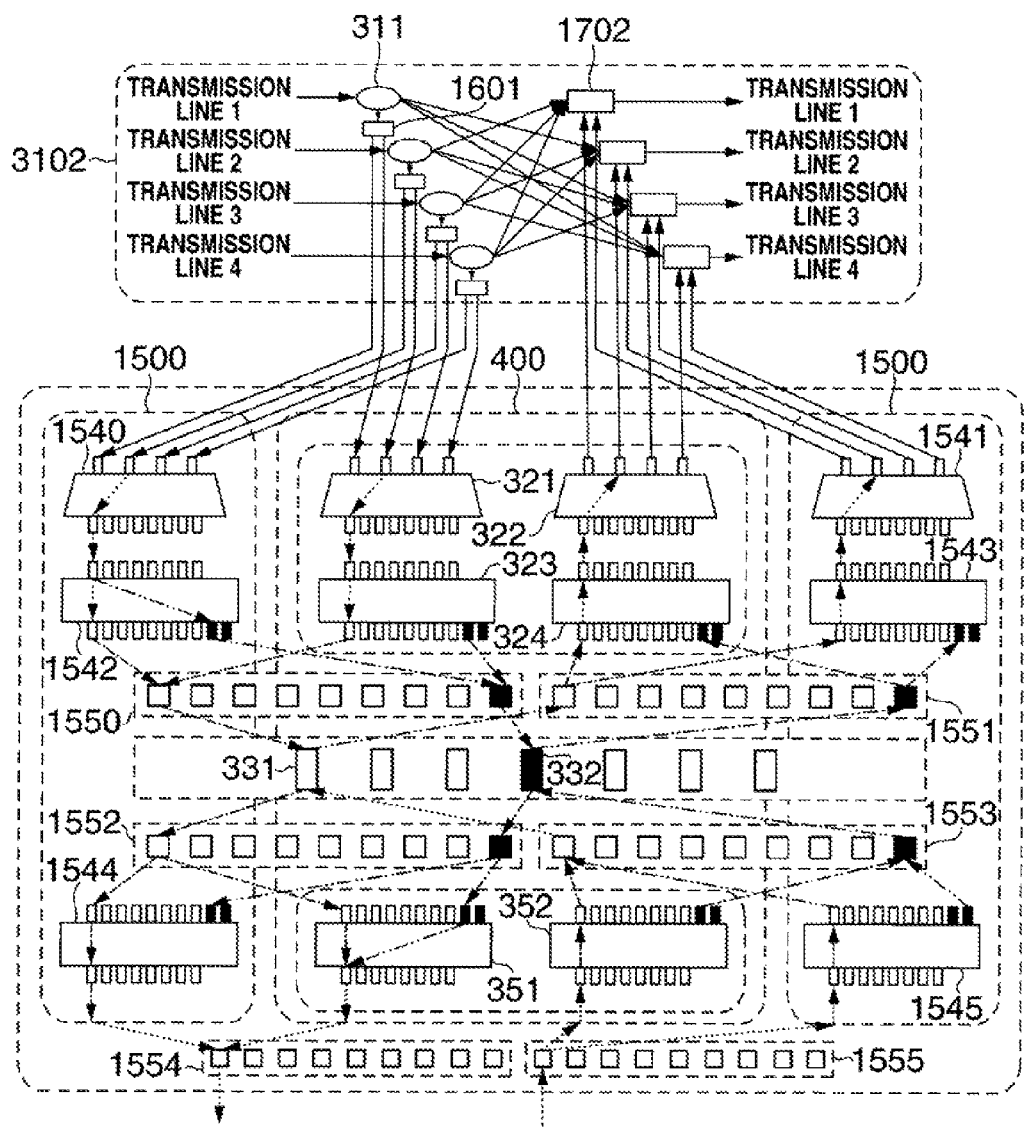
FIG. 15 is a block diagram showing the arrangement of a wavelength path communication node apparatus according to the fifth exemplary embodiment.

FIG. 15 is a block diagram showing the arrangement of a wavelength path communication node apparatus according to the fifth exemplary embodiment of the present invention.

As shown in FIG. 15, a wavelength path communication node apparatus 204 according to the fifth exemplary embodiment includes a WDM line unit 3102, a client accommodation functional unit 400, spare system client accommodation functional units 1500, and operating system/spare system switching optical switches 1550 to 1555.

<<Arrangement of WDM Line Unit>>

The WDM line unit 3102 includes optical branching couplers 311, demultiplexing system wavelength selection switches 1601 connected to the Drop ports of the optical branching couplers 311, and wavelength selection switches 1702.

Figure 16:
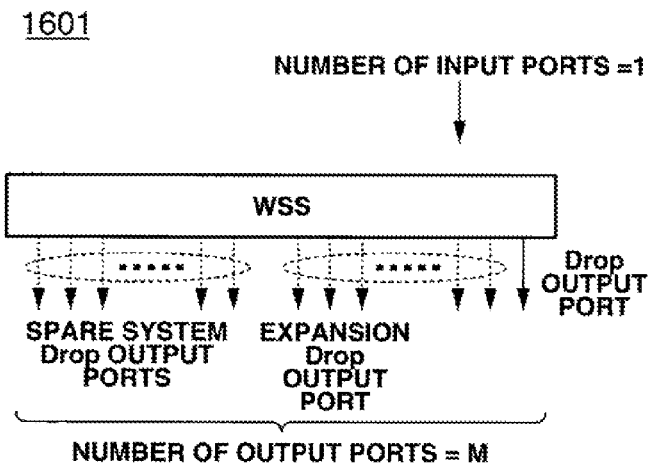
FIG. 16 is a view exemplifying a wavelength selection switch.

FIG. 16 is a view exemplifying the wavelength selection switch. As shown in FIG. 16, the demultiplexing system wavelength selection switch 1601 is configured by adding spare system Drop ports to the demultiplexing system wavelength selection switch 1301 shown in FIG. 12. The number of Drop ports is equal to the sum of the number of operating Drop ports, that of expansion Drop ports, and that of spare system Drop ports.

Figure 17:
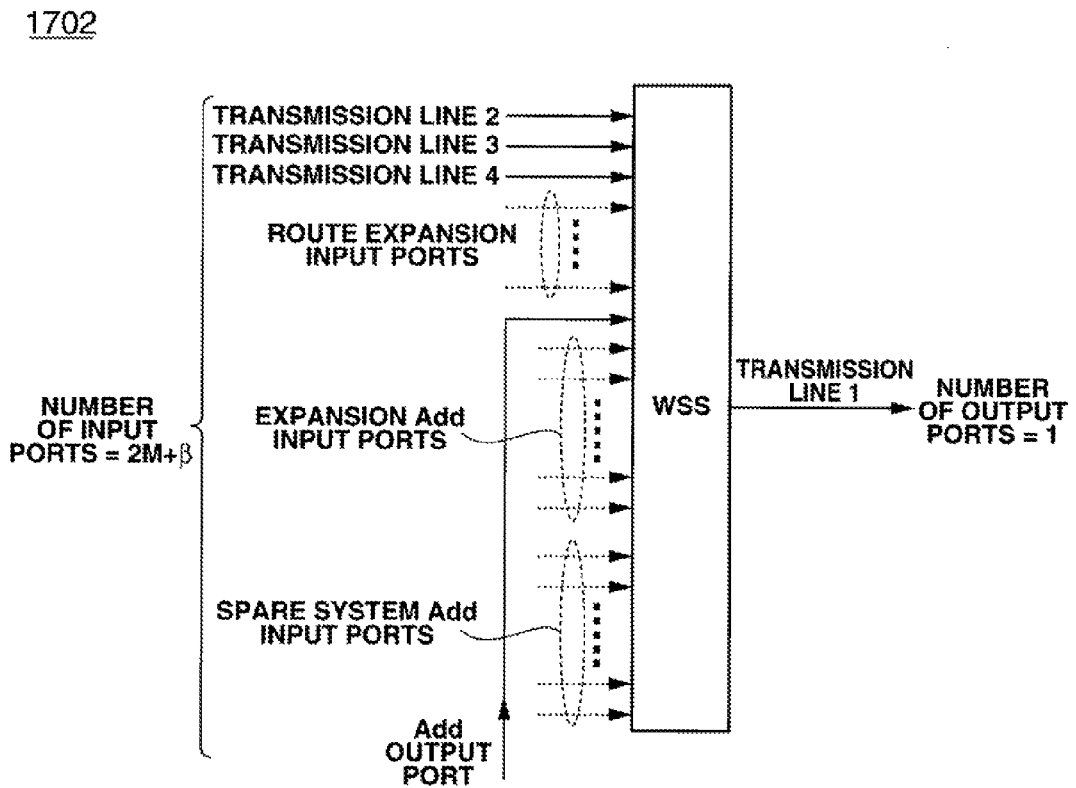
FIG. 17 is a view exemplifying a wavelength selection switch.

FIG. 17 is a view exemplifying the wavelength selection switch. As shown in FIG. 17, the wavelength selection switch 1702 is configured by adding expansion Add input ports to the multiplexing system wavelength selection switch 312 shown in FIG. 6.

<<Arrangement of Spare System Client Accommodation Functional Unit>>

The spare system client accommodation functional unit 1500 includes spare system wavelength multiplexer/demultiplexer units 1540 and 1541, and spare system optical matrix switches 1542 to 1545.

<<Arrangement of Operating System/Spare System Switching Optical Switch>>

The operating system/spare system switching optical switches 1550 to 1555 are formed from well-known optical multiplexing couplers. In the fifth exemplary embodiment, the operating system/spare system switching optical switches 1550, 1553, and 1554 may be formed from 2-input 1-output optical multiplexing couplers. The operating system/spare system switching optical switches 1551, 1552, and 1555 may be formed from 1-input 2-output optical branching couplers.

<Operation of Wavelength Path Communication Node Apparatus>

When a fault occurs in one of a wavelength path demultiplexer 321, wavelength path multiplexer 322, demultiplexing system optical matrix switch 323, multiplexing system optical matrix switch 324, and client system optical matrix switches 351 and 352 in the operating system client accommodation functional unit 400, the wavelength path communication node apparatus 204 implements fault recovery by switching the demultiplexing system wavelength selection switch 1601, wavelength selection switch 1702, and operating system/spare system switching optical switches 1550 to 1555 to switch the wavelength path in the apparatus to the spare system. This operation will be explained below.

In FIG. 15, assume that a wavelength path is branched from transmission line #2 at the optical branching coupler 311, and in a normal state, a node controller 340 (not shown) selects the operating system client accommodation functional unit 400 by the demultiplexing system wavelength selection switch 1601.

When setting a wavelength path, the node controller 340 sets the respective switches to establish a wavelength path in the order of the wavelength path demultiplexer 321, the demultiplexing system optical matrix switch 323, the operating system/spare system switching optical switch 1550, a transponder 331, the operating system/spare system switching optical switch 1552, the client system optical matrix switch 351, and the operating system/spare system switching optical switch 1554.

If a fault occurs in the wavelength path demultiplexer 321 or demultiplexing system optical matrix switch 323, the node controller 340 switches the demultiplexing system wavelength selection switch 1601 and operating system/spare system switching optical switch 1550 from the wavelength path using the operating system to one using the spare system wavelength multiplexer/demultiplexer unit 1540 and optical matrix switch 1542. At this time, the switch setting state of the demultiplexing system optical matrix switch 323 of the operating system is stored in the switching state storage unit (not shown) of the node controller 340. The switch setting state of the spare system optical matrix switch 1542 is controlled based on the set information to inherit the switch setting state of the operating system.

If a fault occurs in the client system optical matrix switch 351, the node controller 340 switches the operating system/ spare system switching optical switches 1552 and 1554 from the wavelength path using the operating system to one using the client system optical matrix switch 1544 of the spare system. At this time, the switch setting state of the client system optical matrix switch 351 of the operating system is stored in the transponder information table of the node controller 340. Switching of the client system optical matrix switch 1544 of the spare system is controlled based on the setting state to maintain the switch setting state of the operating system.

When the operating system/spare system switching optical switches 1550, 1553, and 1554 are formed from 2-input 1-output optical multiplexing couplers, and the operating system/spare system switching optical switches 1551, 1552, and 1555 are formed from 1-input 2-output optical branching couplers, the node controller 340 need not perform switching setting control for the operating system/spare system switching optical switches.

In the fifth exemplary embodiment, a wavelength path signal within the apparatus that is dropped from a transmission line, passes through a transponder, and reaches a client, and a client signal path have been described. However, the fifth exemplary embodiment also applies to a wavelength path signal within the apparatus that is transmitted from a client, passes through a transponder, and is added to a transmission line, and a client signal path.

Even when a fault occurs in the client accommodation functional unit 400 and a fault further occurs in the transponder 331 in the wavelength path communication node apparatus 204 shown in FIG. 15, the wavelength path communication node apparatus 204 can be recovered from the faults using a transponder 332 shared as a spare system.

Figure 18:
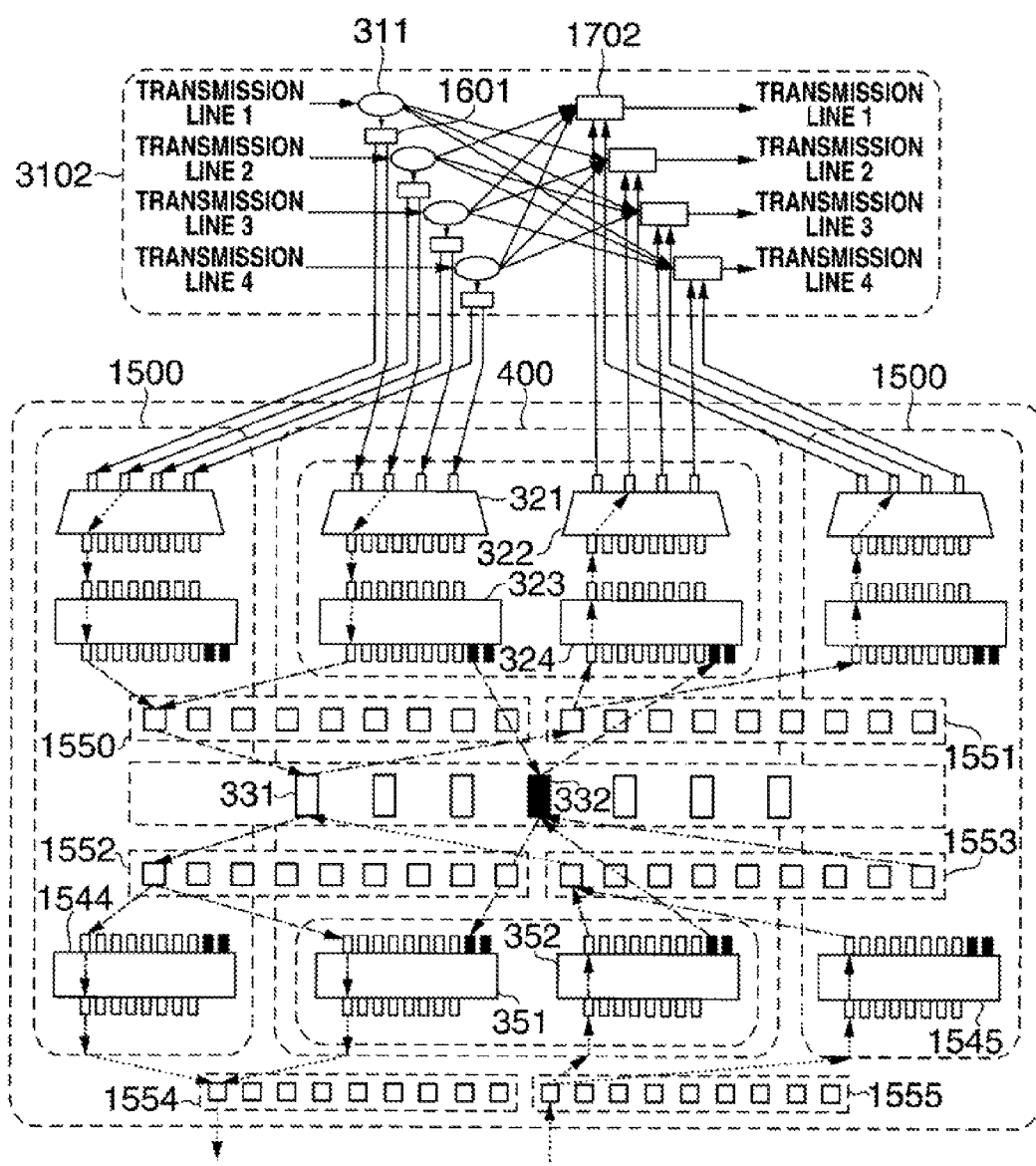
FIG. 18 is a block diagram exemplifying another arrangement of the wavelength path communication node apparatus.

FIG. 18 is a block diagram exemplifying another arrangement of the wavelength path communication node apparatus. If the wavelength path communication node apparatus need not cope with recovery of a transponder fault when a fault occurs in the client accommodation functional unit 400, the wavelength path communication node apparatus is configured as a wavelength path communication node apparatus 205 shown in FIG. 18.

Figure 19:
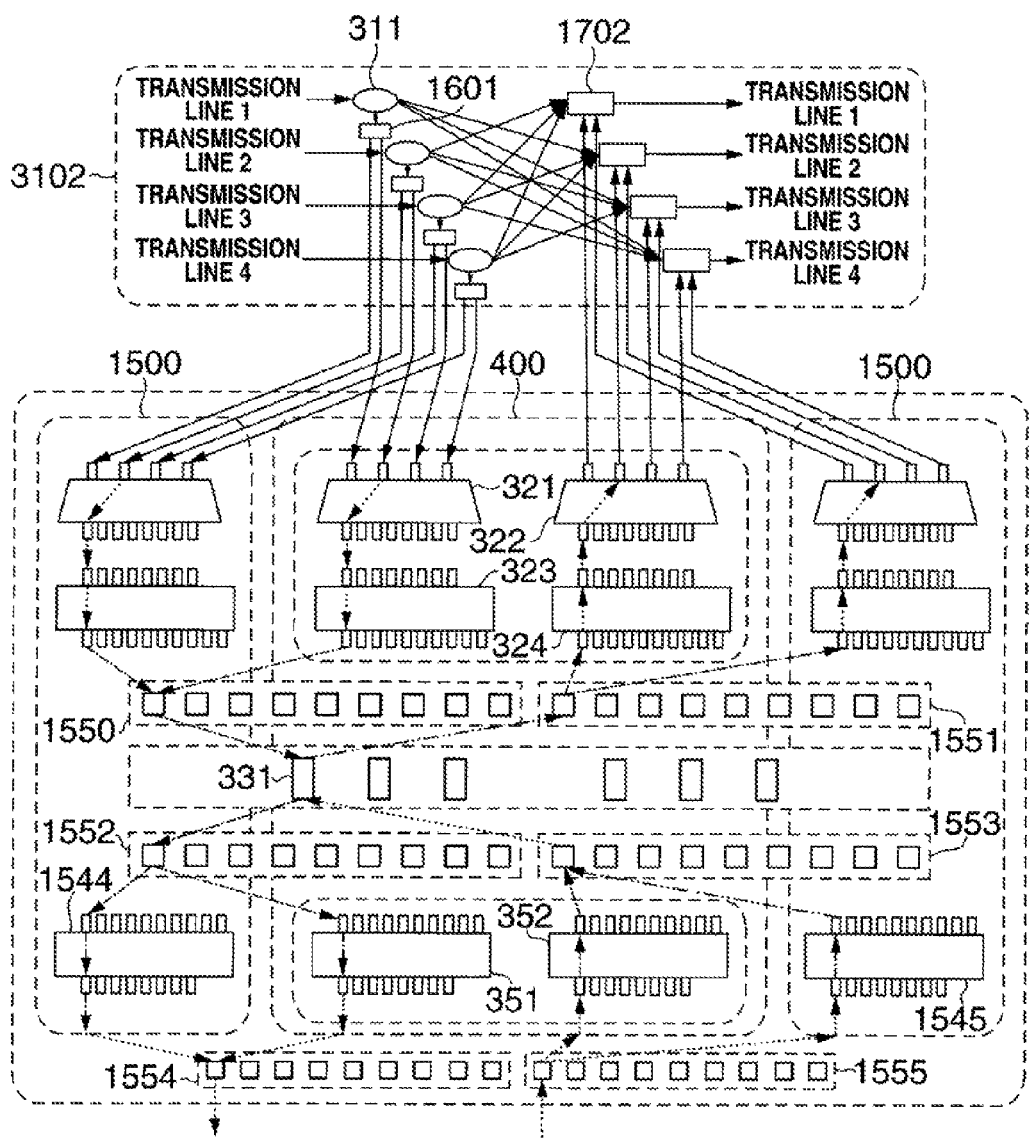
FIG. 19 is a block diagram exemplifying still another arrangement of the wavelength path communication node apparatus.

FIG. 19 is a block diagram exemplifying still another arrangement of the wavelength path communication node apparatus. When the transponder redundancy itself is unnecessary, the wavelength path communication node apparatus is configured as a wavelength path communication node apparatus 206 shown in FIG. 19. The operations of the wavelength path communication node apparatuses 205 and 206 are the same as that of the wavelength path communication node apparatus 204 shown in FIG. 15 except for a switching operation to the spare system transponder. In FIGS. 18 and 19, the same reference names and numerals as those in the wavelength path communication node apparatus 204 shown in FIG. 15 denote the same parts.

Sixth Exemplary Embodiment

The sixth exemplary embodiment according to the present invention will be described. In the sixth exemplary embodiment, the same reference names and numerals as those in the first to fifth exemplary embodiments denote the same parts, and a detailed description thereof will not be repeated.

<Arrangement of Wavelength Path Communication Node Apparatus>

Figure 20:
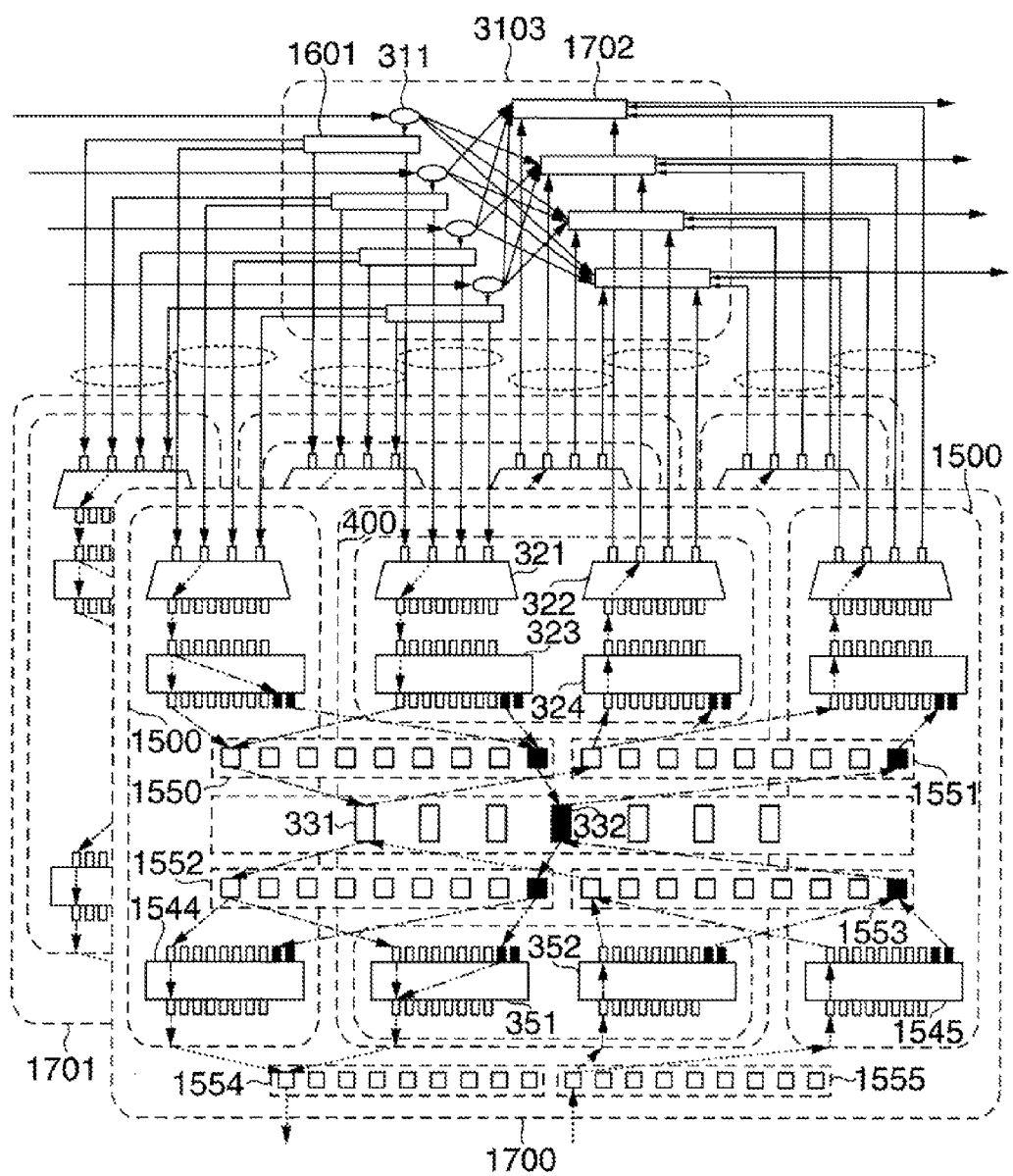
FIG. 20 is a block diagram showing the arrangement of a wavelength path communication node apparatus according to the sixth exemplary embodiment.

FIG. 20 is a block diagram showing the arrangement of a wavelength path communication node apparatus according to the sixth exemplary embodiment of the present invention. As shown in FIG. 20, a wavelength path communication node apparatus 207 includes a WDM line unit 3103, and two operating system/spare system transponder accommodation functional units 1700 and 1701.

<<Arrangement of Operating System/Spare System Transponder Accommodation Functional Unit>>

The operating system/spare system transponder accommodation functional unit 1700 shown in FIG. 20 is formed from a set of an operating system client accommodation functional unit 400 and spare system client accommodation functional units 1500 shown in FIG. 15. In the sixth exemplary embodiment, the two operating system/spare system transponder accommodation functional units 1700 and 1701 are connected to the WDM line unit 3103.

With this arrangement, according to the sixth exemplary embodiment, the number of accommodated transponders can be increased using the transponder accommodation functional units of the operating and spare systems as a resource unit. In FIG. 20, two operating system/spare system transponder accommodation functional units are arranged. However, the number of operating system/spare system transponder accommodation functional units can be increased up to the number of operating system/spare system expansion Add/Drop ports ensured in each of demultiplexing system wavelength selection switches 1601 and 1501 in the WDM line unit 3103.

Note that the operation of switching a wavelength path in the apparatus against a fault is the same as that in the fifth exemplary embodiment, and is independently controlled in the operating system/spare system transponder accommodation functional unit 1700 or 1701.

Figure 21:
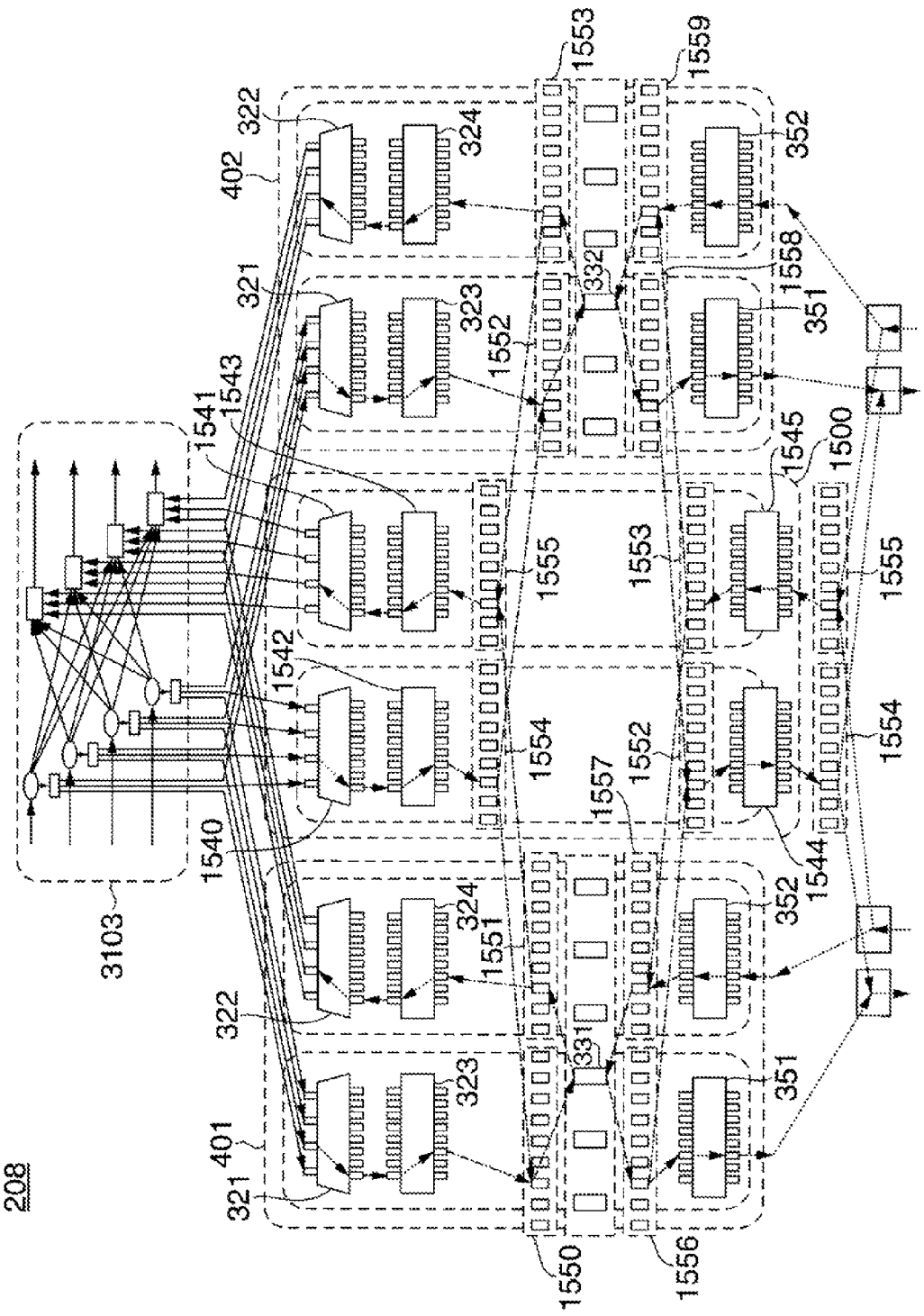
FIG. 21 is a block diagram exemplifying another arrangement of the wavelength path communication node apparatus.
Figure 22:
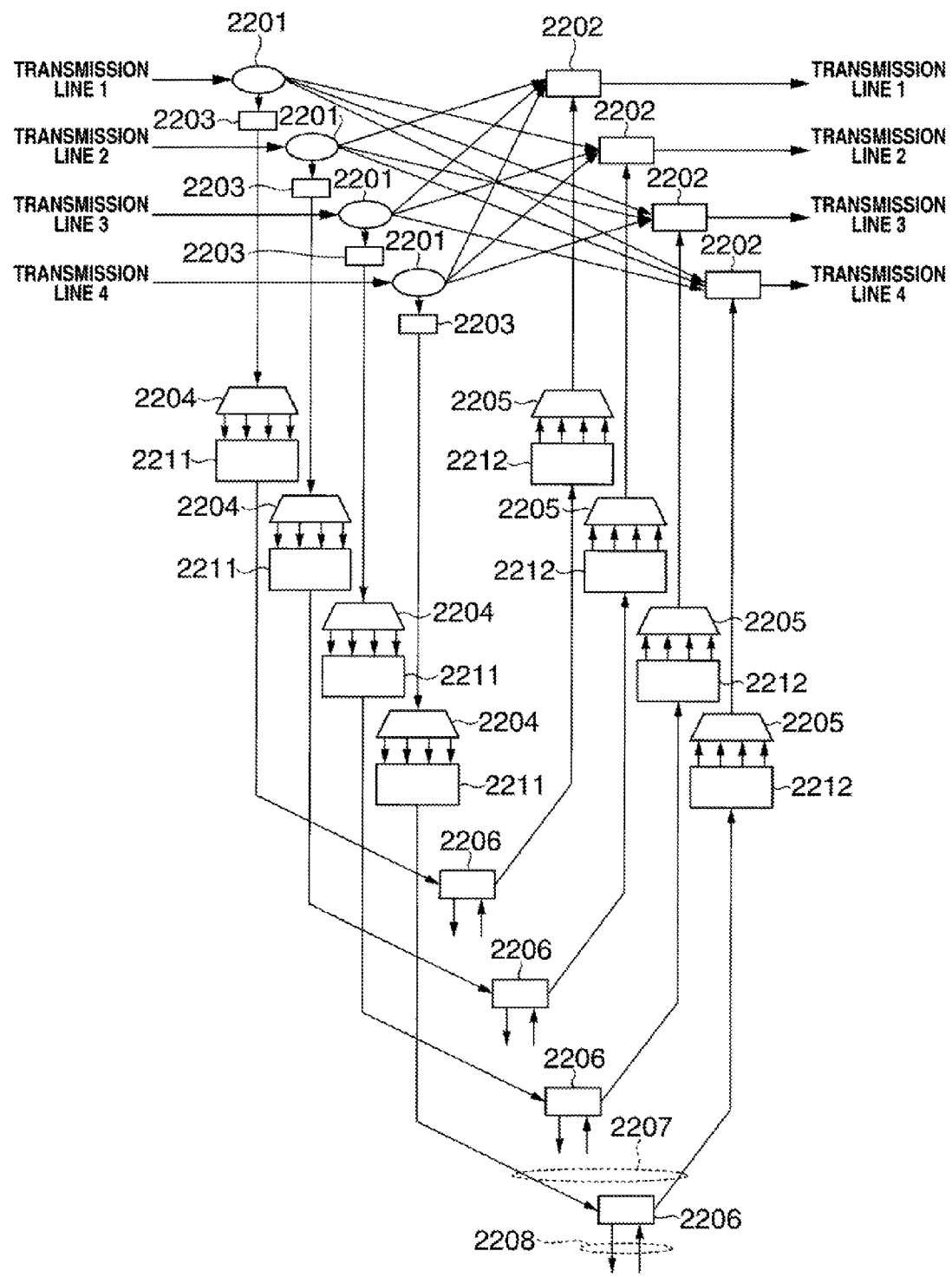
FIG. 22 is a block diagram exemplifying a conventional node apparatus.
Figure 23:
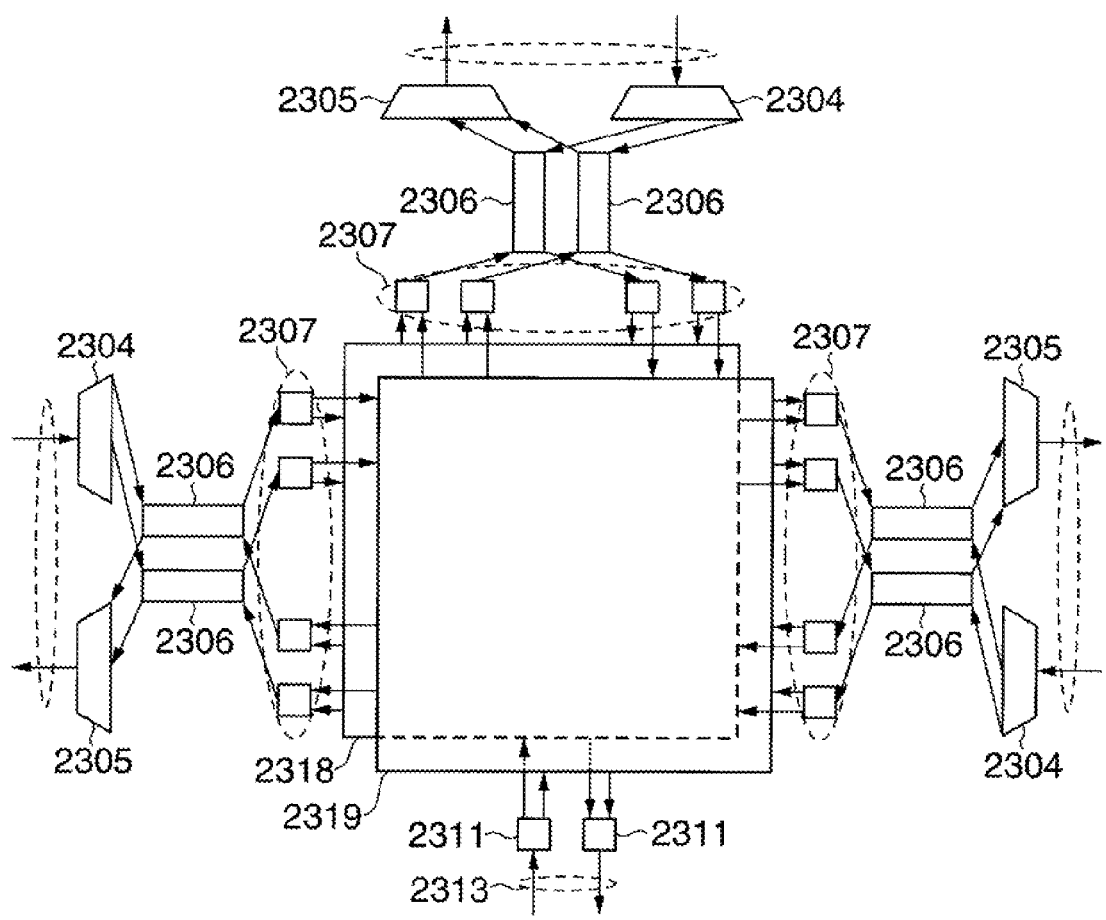
FIG. 23 is a block diagram exemplifying a conventional node apparatus.
Figure 24:
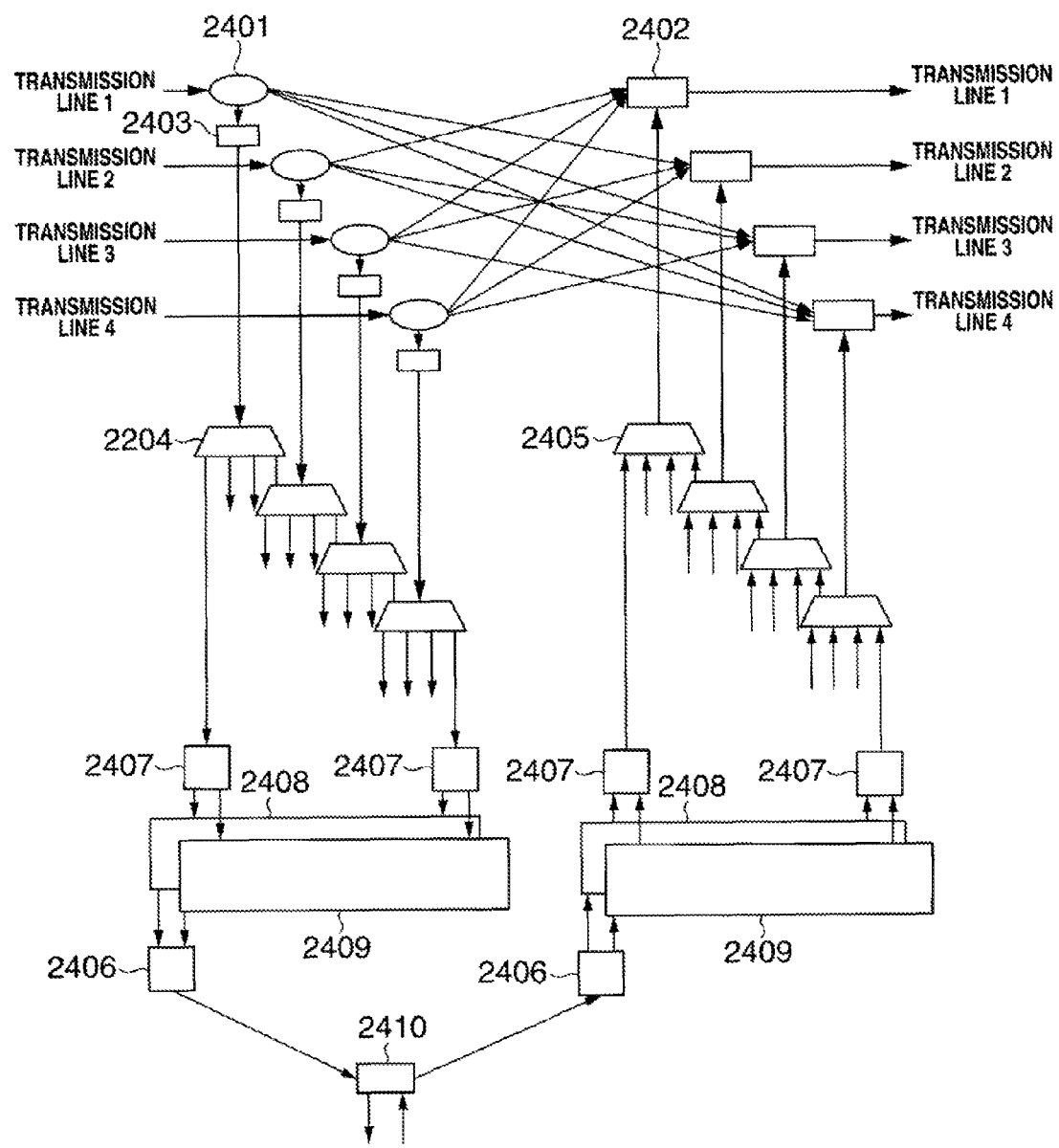
FIG. 24 is a block diagram exemplifying a conventional node apparatus.

FIG. 21 is a block diagram exemplifying another arrangement of the wavelength path communication node apparatus. As shown in FIG. 21, the wavelength path communication node apparatus may include two operating system client accommodation functional units 401 and 402 and one spare system client accommodation functional unit 1500. In a wavelength path communication node apparatus 208 shown in FIG. 21, the two operating system client accommodation functional units 401 and 402 share the spare system client accommodation functional unit 1500.

FIG. 21 illustrates two operating systems and one spare system. However, arbitrary numbers of operating systems and spare systems to be arranged can be selected within the range of the number of operating system/spare system expansion Add/Drop ports ensured in the demultiplexing system wavelength selection switches 1601 and 1501 in the WDM line unit 3103, and a 1:n or m:n redundant configuration can be employed. In the m:n redundant configuration, a switching selection sequence and the like for a plurality of shared spare systems need to be determined in advance.

In this case, the operation of switching a wavelength path in the apparatus against a fault is the same as that in the fifth exemplary embodiment. However, when a fault occurs in either the operating system client accommodation functional unit 401 or 402 and the spare system client accommodation functional unit 1500 serves as an operating system switching target for fault recovery, the spare system client accommodation functional unit can be shared for the operating system client accommodation functional unit. However, even if a fault occurs in another operating system client accommodation functional unit, fault recovery is impossible.

INDUSTRIAL APPLICABILITY

The present invention is applicable to various apparatuses and the like regarding a wavelength multiplexing/demultiplexing optical communication network.

This application is the National Phase of PCT/JP2009/059419, filed May 22, 2009, which is based upon and claims the benefit of priority from Japanese Patent Application No. 2008-136614, filed on May 26, 2008, the disclosure of which is incorporated herein in its entirety by reference.

The invention claimed is:

1. A wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the apparatus comprising:

a plurality of optical branching couplers which are arranged for the respective wavelength multiplexing transmission lines, and each of which branches power of an optical signal received from the wavelength multiplexing transmission line into a plurality of branched optical signals;

a plurality of multiplexing system wavelength selection switches which are arranged for the respective wavelength multiplexing transmission lines, and each of which selects wavelength path signals of arbitrary wavelengths from the plurality of branched optical signals branched by said optical branching couplers, multiplexes the wavelength path signals into one optical signal, and transmits the optical signal to the wavelength multiplexing transmission line;

a wavelength path demultiplexer which includes a plurality of wavelength multiplexing ports that are arranged for said respective optical branching couplers and receive the branched optical signals from said optical branching couplers, and a plurality of wavelength demultiplexing ports whose connection correspondence with the wavelength multiplexing ports is uniquely determined by a wavelength, and which demultiplexes the branched optical signals input to the wavelength multiplexing ports into wavelength path signals of respective wavelengths, and outputs the wavelength path signals from the wavelength demultiplexing ports corresponding to the respective wavelengths;

a wavelength path multiplexer which includes a plurality of wavelength multiplexing ports that are arranged for said respective multiplexing system wavelength selection switches and output wavelength path signals of at least one wavelength to said multiplexing system wavelength selection switches, and a plurality of wavelength demultiplexing ports whose connection correspondence with the wavelength multiplexing ports is uniquely determined by a wavelength, and which outputs wavelength path signals input to the wavelength demultiplexing ports from the wavelength multiplexing ports corresponding to wavelengths of the wavelength path signals;

a plurality of transponders each of which includes a wavelength path transmission port and a wavelength path reception port, is connected to a client apparatus that performs data communication using a wavelength path of one wavelength, converts a wavelength path signal input to the wavelength path transmission port into a client transmission signal to transmit the client transmission signal to the client apparatus, and converts a client reception signal received from the client apparatus into a wavelength path signal of the wavelength to output the wavelength path signal from the wavelength path reception port;

a demultiplexing system optical matrix switch which switches and connects the wavelength demultiplexing ports of said wavelength path demultiplexer and the wavelength path transmission ports of said transponders;

a multiplexing system optical matrix switch which switches and connects the wavelength demultiplexing ports of said wavelength path multiplexer and the wavelength path reception ports of said transponders;

a node controller which controls switching of said multiplexing system wavelength selection switches, said demultiplexing system optical matrix switch, and said multiplexing system optical matrix switch, assigns a wavelength path of one wavelength to said transponder, and acquires a fault generation notification from a counter transponder detected by said transponder;

a transponder information table which stores, for an identification number of each transponder, connection port numbers of said demultiplexing system optical matrix switch and said multiplexing system optical matrix switch to which said transponder is connected, a transmission line number of the wavelength multiplexing transmission line on which an operating system wavelength path of said transponder is multiplexed, and a wavelength number indicating a wavelength of the operating system wavelength path; and a port correspondence table which stores, for a wavelength number indicating a wavelength of each wavelength path, a correspondence between a transmission line number of the wavelength multiplexing transmission line connected to each wavelength multiplexing port and a port number of the wavelength demultiplexing port as the connection correspondences in said wavelength path demultiplexer and said wavelength path multiplexer, wherein when setting the operating system wavelength path of said transponder, said node controller looks up said transponder information table to acquire the transmission line number, the wavelength number, and the connection port number regarding the operating system wavelength path of said transponder, looks up said port correspondence table to specify port numbers indicating the wavelength demultiplexing ports of said wavelength path multiplexer and said wavelength path demultiplexer corresponding to the transmission line number and the wavelength number, and controls switching of said demultiplexing system optical matrix switch and said multiplexing system optical matrix switch to connect the wavelength demultiplexing port of the port number specified from said port correspondence table and a connection port of the connection port number acquired from said transponder information table.

2. A wavelength path communication node apparatus according to claim 1, further comprising:
a plurality of client accommodation functional units each including said wavelength path demultiplexer, said wavelength path multiplexer, said demultiplexing system optical matrix switch, said multiplexing system optical matrix switch, and said transponder; and
a plurality of demultiplexing system wavelength selection switches which are arranged for said respective optical branching couplers, and each of which outputs a branched optical signal from said optical branching coupler to the wavelength multiplexing port of said wavelength path demultiplexer included in one of said client accommodation functional units.

3. A wavelength path communication node apparatus according to claim 1, further comprising a client system optical matrix switch which switches and connects said respective transponders and a plurality of client apparatuses.

4. A wavelength path communication node apparatus according to claim 1, wherein
said transponder information table further stores, for the identification number of each transponder, a transmission line number of the wavelength multiplexing transmission line on which a spare system wavelength path of said transponder is multiplexed, and a wavelength number indicating a wavelength of the spare system wavelength path, and
when said node controller detects generation of a fault on a wavelength path from the fault generation notification detected by said transponder, said node controller looks up said transponder information table to acquire the transmission line number, the wavelength number, and the connection port regarding the spare system wavelength path of said transponder, looks up said port correspondence table to specify port numbers indicating the wavelength demultiplexing ports of said wavelength path multiplexer and said wavelength path demultiplexer corresponding to the transmission line number and the wavelength number, and controls switching of said demultiplexing system optical matrix switch and said multiplexing system optical matrix switch to connect the wavelength demultiplexing port of the port number specified from said port correspondence table and the connection port of a connection port number acquired from said transponder information table.

5. A wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the apparatus comprising:

a plurality of optical branching couplers which are arranged for the respective wavelength multiplexing transmission lines, and each of which branches power of an optical signal received from the wavelength multiplexing transmission line into a plurality of branched optical signals:

a plurality of multiplexing system wavelength selection switches which are arranged for the respective wavelength multiplexing transmission lines, and each of which selects wavelength path signals of arbitrary wavelengths from the plurality of branched optical signals branched by said optical branching couplers, multiplexes the wavelength path signals into one optical signal, and transmits the optical signal to the wavelength multiplexing transmission line:

a wavelength path demultiplexer which includes a plurality of wavelength multiplexing ports that are arranged for said respective optical branching couplers and receive the branched optical signals from said optical branching couplers, and a plurality of wavelength demultiplexing ports whose connection correspondence with the wavelength multiplexing ports is uniquely determined by a wavelength, and which demultiplexes the branched optical signals input to the wavelength multiplexing ports into wavelength path signals of respective wavelengths, and outputs the wavelength path signals from the wavelength demultiplexing ports corresponding to the respective wavelengths;

a wavelength path multiplexer which includes a plurality of wavelength multiplexing ports that are arranged for said respective multiplexing system wavelength selection switches and output wavelength path signals of at least one wavelength to said multiplexing system wavelength selection switches, and a plurality of wavelength demultiplexing ports whose connection correspondence with the wavelength multiplexing ports is uniquely determined by a wavelength, and which outputs wavelength path signals input to the wavelength demultiplexing ports from the wavelength multiplexing ports corresponding to wavelengths of the wavelength path signals;

a plurality of transponders each of which includes a wavelength path transmission port and a wavelength path reception port, is connected to a client apparatus that performs data communication using a wavelength path of one wavelength, converts a wavelength path signal input to the wavelength path transmission port into a client transmission signal to transmit the client transmission signal to the client apparatus, and converts a client reception signal received from the client apparatus into a wavelength path signal of the wavelength to output the wavelength path signal from the wavelength path reception port;

a demultiplexing system optical matrix switch which switches and connects the wavelength demultiplexing ports of said wavelength path demultiplexer and the wavelength path transmission ports of said transponders;

a multiplexing system optical matrix switch which switches and connects the wavelength demultiplexing ports of said wavelength path multiplexer and the wavelength path reception ports of said transponders;

a client system optical matrix switch which switches and connects said respective transponders and a plurality of client apparatuses;

a node controller which controls switching of said demultiplexing system optical matrix switch, said multiplexing system optical matrix switch, and said client system optical matrix switch, assigns a wavelength path of one wavelength to said transponder, and detects generation of a fault in said transponder; and a transponder information table which stores, for an identification number of each transponder, an identification number of a spare system transponder assigned as a spare system of said transponder, and connection port numbers of said demultiplexing system optical matrix switch, said multiplexing system optical matrix switch, and said client system optical matrix switch to which said spare system transponder is connected, wherein when said node controller detects generation of a fault in said transponder which operates as an operating system, said node controller looks up said transponder information table to acquire the identification number of said spare system transponder regarding said operating system transponder, and connection port numbers of said demultiplexing system optical matrix switch, said multiplexing system optical matrix switch, and said client system optical matrix switch regarding said spare system transponder, and controls switching of said demultiplexing system optical matrix switch, said multiplexing system optical matrix switch, and said client system optical matrix switch to connect connection ports of the connection port numbers and said spare system transponder.

6. A wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the apparatus comprising:

a plurality of optical branching couplers which are arranged for the respective wavelength multiplexing transmission lines, and each of which branches power of an optical signal received from the wavelength multiplexing transmission line into a plurality of branched optical signals;

a plurality of multiplexing system wavelength selection switches which are arranged for the respective wavelength multiplexing transmission lines and each of which selects wavelength path signals of arbitrary wavelengths from the plurality of branched optical signals branched by said optical branching couplers, multiplexes the wavelength path signals into one optical signal, and transmits the optical signal to the wavelength multiplexing transmission line;

a wavelength path demultiplexer which includes a plurality of wavelength multiplexing ports that are arranged for said respective optical branching couplers and receive the branched optical signals from said optical branching couplers, and a plurality of wavelength demultiplexing ports whose connection correspondence with the wavelength multiplexing ports is uniquely determined by a wavelength, and which demultiplexes the branched optical signals input to the wavelength multiplexing ports into wavelength path signals of respective wavelengths, and outputs the wavelength path signals from the wavelength demultiplexing ports corresponding to the respective wavelengths;

a wavelength path multiplexer which includes a plurality of wavelength multiplexing orts that are arranged for said respective multiplexing system wavelength selection switches and output wavelength path signals of at least one wavelength to said multiplexing system wavelength selection switches, and a plurality of wavelength demultiplexing ports whose connection correspondence with the wavelength multiplexing ports is uniquely determined by a wavelength, and which outputs wavelength path signals input to the wavelength demultiplexing ports from the wavelength multiplexing ports corresponding to wavelengths of the wavelength path signals;

a plurality of transponders each of which includes a wavelength path transmission port and a wavelength path reception port, is connected to a client apparatus that performs data communication using a wavelength path of one wavelength, converts a wavelength path signal input to the wavelength path transmission sort into a client transmission signal to transmit the client transmission signal to the client apparatus, and converts a client reception signal received from the client apparatus into a wavelength path signal of the wavelength to output the wavelength path signal from the wavelength path reception port;

a demultiplexing system optical matrix switch which switches and connects the wavelength demultiplexing ports of said wavelength path demultiplexer and the wavelength path transmission ports of said transponders;

a multiplexing system optical matrix switch which switches and connects the wavelength demultiplexing ports of said wavelength path multiplexer and the wavelength path reception ports of said transponders;

a client system optical matrix switch which switches and connects said respective transponders and a plurality of client apparatuses;

a plurality of client accommodation functional units each including said wavelength path demultiplexer, said wavelength path multiplexer, said demultiplexing system optical matrix switch, said multiplexing system optical matrix switch, and said client system optical matrix switch, one of said client accommodation functional units serving as an operating system client accommodation functional unit used as an operating system, and another one of said client accommodation functional units serving as a spare system client accommodation functional unit used as a spare system;

an aggregator system switching optical switch which is interposed between said wavelength path demultiplexer, said wavelength path multiplexer, and said transponders, and switches and connects said operating system client accommodation functional unit and said spare system client accommodation functional unit;

a pool system switching optical switch which is interposed between said transponders and said client system optical matrix switch, and switches and connects said operating system client accommodation functional unit and said spare system client accommodation functional unit; and a client system switching optical switch which is interposed between said client system optical matrix switch and the client apparatus, and switches and connects said operating system client accommodation functional unit and said spare system client accommodation functional unit.

7. A wavelength path communication node apparatus according to claim 6, further comprising:

a node controller which controls switching of said demultiplexing system wavelength selection switch, said multiplexing system wavelength selection switch, said demultiplexing system optical matrix switch, and said multiplexing system optical matrix switch included in said client accommodation functional unit, and detects generation of a fault in said wavelength path demultiplexer, said wavelength path multiplexer, said demultiplexing system optical matrix switch, said multiplexing system optical matrix switch, and said client system optical matrix switch; and a switching state storage unit which stores switching states of said demultiplexing system optical matrix switch, multiplexing system optical matrix switch, and client system optical matrix switch of said operating system client accommodation functional unit, wherein when said node controller detects generation of a fault in one of said wavelength path demultiplexer, said wavelength path multiplexer, said demultiplexing system optical matrix switch, and said multiplexing system optical matrix switch included in said operating system client accommodation functional unit, said node controller sets switching states of said demultiplexing system optical matrix switch and multiplexing system optical matrix switch of said spare system client accommodation functional unit, based on the switching states acquired from said switching state storage unit, and controls switching of said demultiplexing system wavelength selection switch, said multiplexing system wavelength selection switch, and said aggregator system switching optical switch to set a wavelength path between said transponder and the multiplexing transmission line via said spare system client accommodation functional unit, and when said node controller detects generation of a fault in said client system optical matrix switch included in said operating system client accommodation functional unit, said node controller sets a switching state of said client system optical matrix switch of said spare system client accommodation functional unit, based on the switching states acquired from said switching state storage unit, and controls switching of said pool system switching optical switch and said client system switching optical matrix switch to set a wavelength path between said transponder and the client apparatus via said spare system client accommodation functional unit.

8. A wavelength path communication node apparatus according to claim 6, further comprising:

a node controller which controls switching of said demultiplexing system wavelength selection switch, said multiplexing system wavelength selection switch, said demultiplexing system optical matrix switch, and said multiplexing system optical matrix switch included in said client accommodation functional unit, and detects generation of a fault in said transponder; and a transponder information table which stores, for an identification number of each transponder, an identification number of a spare system transponder assigned as a spare system of said transponder, and connection port numbers of said demultiplexing system optical matrix switch, said multiplexing system optical matrix switch, and said client system optical matrix switch to which said spare system transponder is connected,
wherein when generation of a fault in said transponder included in said operating system client accommodation functional unit is detected, said transponder information table is looked up to acquire an identification number of said spare system transponder regarding said operating system transponder, and connection port numbers of said demultiplexing system optical matrix switch, said multiplexing system optical matrix switch, and said client system optical matrix switch regarding said spare system transponder, and switching of said demultiplexing system optical matrix switch, said multiplexing system optical matrix switch, said client system optical matrix switch, said aggregator system switching optical switch, and said pool system switching optical switch is controlled to connect connection ports of the connection port numbers and said spare system transponder.

9. A wavelength path communication control method used in a wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines, the method comprising the steps of:
causing each of optical branching couplers arranged for the respective wavelength multiplexing transmission lines to branch power of an optical signal received from the wavelength multiplexing transmission line into a plurality of branched optical signals;
causing each of multiplexing system wavelength selection switches arranged for the respective wavelength multiplexing transmission lines to select wavelength path signals of arbitrary wavelengths from the plurality of branched optical signals branched by the optical branching couplers, multiplex the wavelength path signals into one optical signal, and transmit the optical signal to the wavelength multiplexing transmission line;
causing a wavelength path demultiplexer including a plurality of wavelength multiplexing ports that are arranged for the respective optical branching couplers and receive the branched optical signals from the optical branching couplers, and a plurality of wavelength demultiplexing ports whose connection correspondence with the wavelength multiplexing ports is uniquely determined by a wavelength, to demultiplex the branched optical signals input to the wavelength multiplexing ports into wavelength path signals of respective wavelengths, and output the wavelength path signals from the wavelength demultiplexing ports corresponding to the respective wavelengths;
causing a wavelength path multiplexer including a plurality of wavelength multiplexing ports that are arranged for the respective multiplexing system wavelength selection switches and output wavelength path signals of at least one wavelength to the multiplexing system wavelength selection switches, and a plurality of wavelength demultiplexing ports whose connection correspondence with the wavelength multiplexing ports is uniquely determined by a wavelength, to output wavelength path signals input to the wavelength demultiplexing ports from the wavelength multiplexing ports corresponding to wavelengths of the wavelength path signals;
causing a plurality of transponders each including a wavelength path transmission port and a wavelength path reception port, to connect to a client apparatus that performs data communication using a wavelength path of one wavelength, convert a wavelength path signal input to the wavelength path transmission port into a client transmission signal, thereby transmitting the client transmission signal to the client apparatus, and convert a client reception signal received from the client apparatus into a wavelength path signal of the wavelength, thereby outputting the wavelength path signal from the wavelength path reception port;
causing a demultiplexing system optical matrix switch to switch and connect the wavelength demultiplexing ports of the wavelength path demultiplexer and the wavelength path transmission ports of the transponders;
causing a multiplexing system optical matrix switch to switch and connect the wavelength demultiplexing ports of the wavelength path multiplexer and the wavelength path reception ports of the transponders;
controlling, by a node controller, switching of said multiplexing system wavelength selection switches, said demultiplexing system optical matrix switch, and said multiplexing system optical matrix switch, assigns a wavelength path of one wavelength to said transponder, and acquires a fault generation notification from a counter transponder detected by said transponder;
storing, by a transponder information table, for an identification number of each transponder, connection port numbers of said demultiplexing system optical matrix switch and said multiplexing system optical matrix switch to which said transponder is connected, a transmission line number of the wavelength multiplexing transmission line on which an operating system wavelength path of said transponder is multiplexed, and a wavelength number indicating a wavelength of the operating system wavelength path; and
storing, by a port correspondence table, for a wavelength number indicating a wavelength of each wavelength path, a correspondence between a transmission line number of the wavelength multiplexing transmission line connected to each wavelength multiplexing port and a port number of the wavelength demultiplexing port as the connection correspondences in said wavelength path demultiplexer and said wavelength path multiplexer,
wherein when setting the operating system wavelength path of said transponder, said node controller looks up said transponder information table to acquire the transmission line number, the wavelength number, and the connection port number regarding the operating system wavelength path of said transponder, looks up said port correspondence table to specify port numbers indicating the wavelength demultiplexing ports of said wavelength path multiplexer and said wavelength path demultiplexer corresponding to the transmission line number and the wavelength number, and controls switching of said demultiplexing system optical matrix switch and said multiplexing system optical matrix switch to connect the wavelength demultiplexing port of the port number specified from said port correspondence table and a connection port of the connection port number acquired from said transponder information table.

10. A non-transitory computer-readable recording medium which records a program for causing, to execute the steps of a wavelength path communication control method defined in claim 9, a computer of a wavelength path communication node apparatus that is used in an optical communication network in which respective traffics are assigned by a wavelength division multiplexing transmission method to a plurality of wavelength paths for performing data communication using optical signals having unique wavelengths, wavelength path signals of the wavelength paths are multiplexed into one optical signal, and the optical signal is transmitted via wavelength multiplexing transmission lines, and that switches and connects the wavelength path between the wavelength multiplexing transmission lines.

\* \* \* \* \*